United States Patent [19]
Jacobs et al.

[11] Patent Number: 6,046,915
[45] Date of Patent: *Apr. 4, 2000

[54] PHASE SELECTION CIRCUIT FOR THREE PHASE POWER CONVERTER AND METHOD OF OPERATION THEREOF

[75] Inventors: Mark E. Jacobs, Dallas; Yimin Jiang; Hengchun Mao, both of Plano, all of Tex.

[73] Assignee: Lucent Technologies Inc., Murray Hill, N.J.

[*] Notice: This patent is subject to a terminal disclaimer.

[21] Appl. No.: 09/118,569

[22] Filed: Jul. 17, 1998

Related U.S. Application Data

[63] Continuation-in-part of application No. 08/804,313, Feb. 21, 1997, Pat. No. 5,784,269.

[51] Int. Cl.$^7$ ............................... H02M 1/12; G05F 1/00
[52] U.S. Cl. ............................... 363/39; 363/37; 363/44; 323/217
[58] Field of Search ............................... 363/39, 44, 45, 363/46, 84, 89, 124, 125, 126; 323/222, 225, 212, 214, 217

[56] References Cited

U.S. PATENT DOCUMENTS

| | | | |
|---|---|---|---|
| 5,576,943 | 11/1996 | Keir | 363/56 |
| 5,764,037 | 6/1998 | Jacobs et al. | 323/222 |
| 5,784,269 | 7/1998 | Jacobs et al. | 363/89 |

OTHER PUBLICATIONS

Universal—Input, High–Power–Factor, Boost Doubler Rectifiers; pp. 459–465; Dragan Maksimovic and Robert Erickson; Power Electronics Group; Department of Electrical and Computer Engineering, University of Colorado, Boulder, CO 80309–0425.

*Primary Examiner*—Jessica Han

[57] ABSTRACT

An active circuit for delivering three phase AC input power received from a three phase rectifier to a boost converter and a method of operating the same. In one embodiment, the active circuit includes a phase selection switching circuit, coupled to the rectifier, that selects an inner phase of the three phase AC input power. The active circuit also includes a switching network, coupled to the phase selection switching circuit and the rectifier, that controls a current waveshape of the inner phase and a current waveshape of at least one other phase, thereby to reduce harmonics associated with three phase AC input current.

30 Claims, 20 Drawing Sheets

121

121

PHASE SELECTION CIRCUIT FOR THREE PHASE POWER CONVERTER AND METHOD OF OPERATION THEREOF

CROSS-REFERENCE TO RELATED APPLICATION

The present invention is a continuation-in-part of Ser. No. 08/804,313, filed on Feb. 21, 1997, now U.S. Pat. No. 5,784,269 entitled "Three Phase High Power Factor Converter Using Phase Selection Circuit," commonly assigned with the present invention and incorporated herein by reference.

TECHNICAL FIELD OF THE INVENTION

The present invention is directed, in general, to power conversion and, more specifically, to a phase selection circuit for a three phase power converter, a method of operating the same and a power converter employing the circuit or the method.

BACKGROUND OF THE INVENTION

Power converters that convert three-phase AC input power to one or more DC power levels are widely known. The prior art power converters include high-power boost converters that output DC voltage levels that are higher than the peak of the AC input supply voltage and buck converters that output DC voltage levels that are less than the peak of the AC input supply voltage.

FIG. 1A illustrates a boost converter 100 in accordance with the prior art. Those skilled in the art will recognize that the boost converter 100 is a six-switch three-phase converter to the three input phases, $\phi A$, $\phi B$ and $\phi C$. The operation of the prior art boost converter 100 is well known, but will be discussed briefly so that the following discussion of the present invention may be more readily understood.

The input stage of the boost converter 100 comprises surge protection diodes 101–106, which clip large transient voltages on the three input lines. The diodes 101–106 do not perform any other significant function in the operation of the boost converter 100 and need not be discussed further. Current flows into and out of the boost converter 100 through inductors 111–113. Switches 121–123 and 131–133 are high speed switches that selectively connect each of the input phases to nodes N1 and N2 on either side of a capacitor 140.

The operation of the boost converter 100 may best be explained by the exemplary situation where $\phi A$ is the most positive voltage and XC is the most negative voltage, i.e., $V_A > 0 > V_B > V_C$. Current flows into the $\phi A$ input, through the inductor 111 and the diode 121a, and onto the capacitor 140. The circuit is completed by the rapid opening and closing (i.e., high-speed pulsing) of the switches 122, 123 at a rate of, for example, 50 kHz. Under normal operation, the voltage on the capacitor 140 is larger than the peak differences between the AC inputs.

When the switches 122, 123 are closed, the current levels in the inductors 111–113 ramp up continuously. When the switches 122, 123 are opened, the currents in the inductors 111–113 store energy on the capacitor 140, thereby maintaining the voltage level on the capacitor 140. The currents in the inductors 111–113 decrease (ramp down) while the current is being stored on the capacitor 140. The voltage on the capacitor 140 is sensed and a feedback circuit (not shown) indirectly adjusts the width of the pulses used to open and close the switches 122, 123. If the voltage level on the capacitor 140 is too low, the pulse width is increased, so that the switches 122, 123 are closed for a longer period of time. This causes the currents in the inductors 111–113 to ramp up to a higher level right before the switches 122, 123 are reopened. This higher current level stores a greater amount of charge on the capacitor 140 when the switches 122, 123 are open, thereby raising the voltage on the capacitor 140.

Conversely, if the voltage level on the capacitor 140 is too high, the pulse width is decreased, so that the switches 122, 123 are closed for a shorter period of time. This allows the currents in the inductors 111–113 to ramp up only to relatively smaller peak levels right before the switches 122, 123 are reopened. This relatively lower current level stores a smaller amount of charge on the capacitor 140 before the switches 122, 123 are reopened, thereby lowering the voltage on the capacitor 140.

When $\phi B$ or $\phi C$ becomes the highest voltage level, the operation of the boost converter 100 is virtually identical to that described above, except that different switch combinations are used to connect the three input phases to the capacitor 140.

FIGS. 1B and 1C illustrate in greater detail exemplary embodiments of unidirectional switches 121–123 and 131–133 that may be used in the prior art boost converter 100 for high power applications that: need multiple parallel switches to carry high current loads. FIG. 1B illustrates a MOSFET switch 121. FIG. 1C illustrates combined MOSFET and an insulated gate bipolar transistor (IGBT) switch 121. The switch 121 is depicted in FIGS. 1B and 1C with a diode in parallel on the right side of the switch. The parallel diode is representative of the diodes 121a–123a and 131a–133a in FIG. 1A.

The boost converter 100 has numerous shortcomings. Of the six active switches 121–123 and 131–133 in the circuit, only two operate at any one time. This is an inefficient utilization of the semiconductor devices. The six diodes must be fast recovery type diodes and each needs a snubber. The control for the switches is very complicated and interleaving pulse-width modulation operations of two or more prior art boost converters in order to reduce output ripple requires a high component count. Finally, the boost converter 100 generates a large amount of EMI noise.

Accordingly, what is needed in the art is an improved boost converter that uses its component semiconductor switches more efficiently by processing most of the principal power in a minimum number of switchers. There is a still further need in the art for a boost converter that has reduced output ripple. There is also a need in the art for a boost converter that has relatively low EMI noise, particularly with respect to equipment ground during high-speed switching.

SUMMARY OF THE INVENTION

To address the above-discussed deficiencies of the prior art, the present invention provides an active circuit for delivering three phase AC input power received from a three phase rectifier to a boost converter and a method of operating the same. In one embodiment, the active circuit includes a phase selection switching circuit, coupled to the rectifier, that selects an inner phase of the three phase AC input power. The active circuit also includes a switching network, coupled to the phase selection switching circuit and the rectifier, that controls a current waveshape of the inner phase and a current waveshape of at least one other phase, thereby to reduce harmonics associated with three phase AC input current.

For purposes of the present invention, "inner phase" is defined as the phase that is between the two extreme phases or the phase that is closest to zero. Those skilled in the art understand that, in three phase electric power at any given moment, one phase is at a highest voltage and another phase is at a lowest voltage. The remaining phase is at some intermediate voltage; this remaining phase is the "inner phase" as used herein.

The present invention therefore recognizes that harmonics in the input of the converter can be reduced if the inner phase is tapped and delivered to the boost converter.

In one embodiment of the present invention, the boost converter includes first and second main switches coupled between rails of the boost converter. In an advantageous embodiment, the switching network includes the first and second main switches. In a related, but alternative embodiment, the boost converter includes first and second main switches and the switching network includes first and second auxiliary switches coupled between the phase selection switching circuit and rails of the boost converter.

In one embodiment of the present invention, the boost converter includes first and second main switches coupled between first and second output capacitors of the boost converter. The switching network in an advantageous embodiment, however, includes first and second auxiliary diodes coupled between the phase selection switching circuit and rails of the boost converter and a bidirectional switch coupled between the first and second auxiliary diodes and the first and second main switches. In a more specific embodiment of the present invention, the bidirectional switch includes a unidirectional switch coupled between nodes of a diode bridge. In a still more specific embodiment of the present invention, the first and second auxiliary diodes are coupled to respective ones of the nodes.

In one embodiment of the present invention, the boost converter includes first and second main switches coupled across first and second output capacitors of the boost converter and a blocking switch coupled between the first and second output capacitors. The switching network in an advantageous embodiment, however, includes first and second auxiliary switches coupled between the phase selection switching circuit and the first and second main switches and first and second auxiliary diodes coupled between the first and second auxiliary switches and rails of the boost converter.

In one embodiment of the present invention, the boost converter further includes at least one blocking switch coupled between the switching network and an output of the boost converter. In an embodiment to be illustrated, the blocking switch is a diode. Of course, the broad scope of the present invention, however, is not so limited.

In one embodiment of the present invention, the boost converter is selected from the group consisting of a three-level boost converter and a split boost converter. Any boost converter or related topology is well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
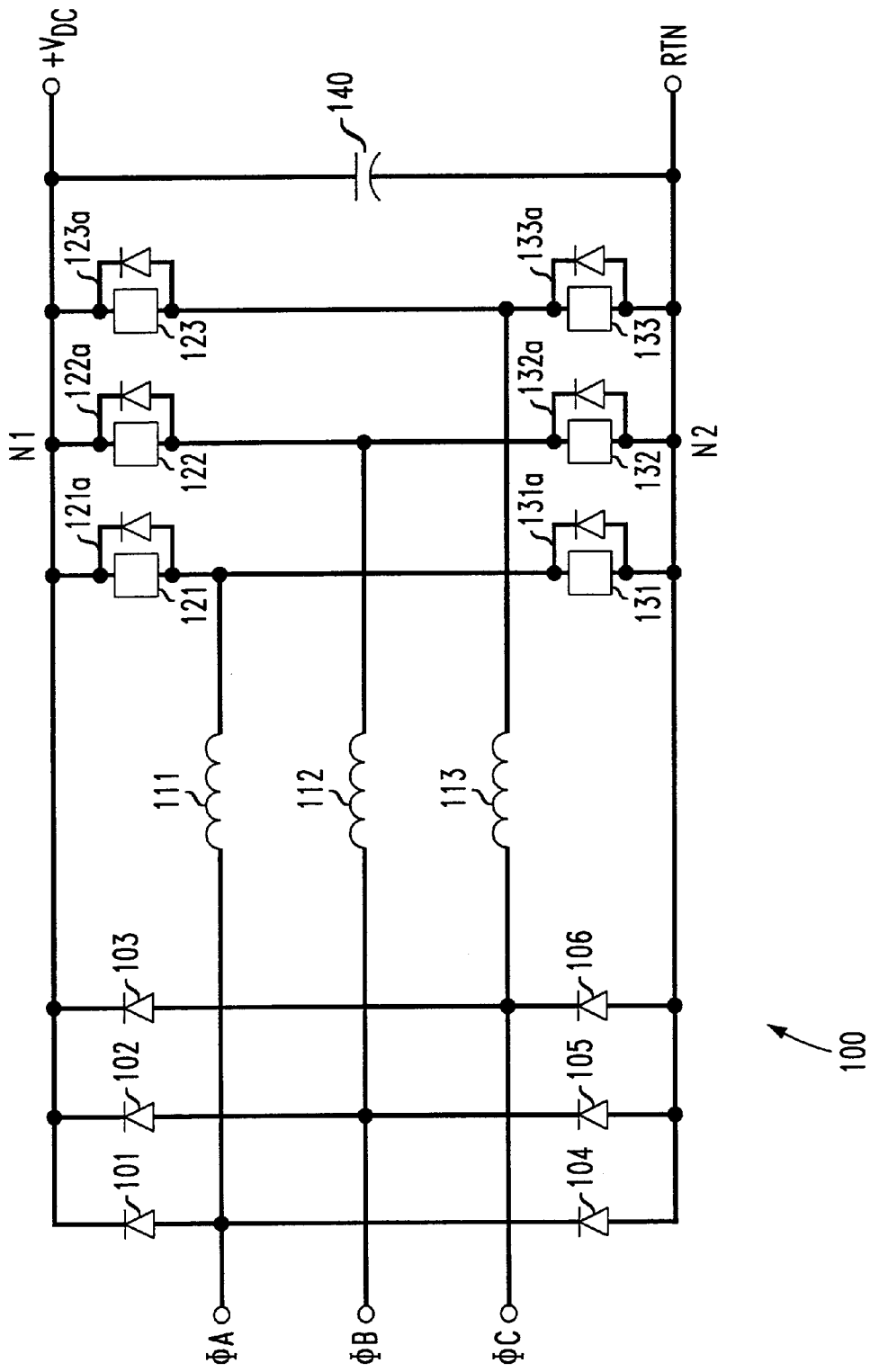
FIG. 1A illustrates a boost converter in accordance with the prior art.
Figure 1B:
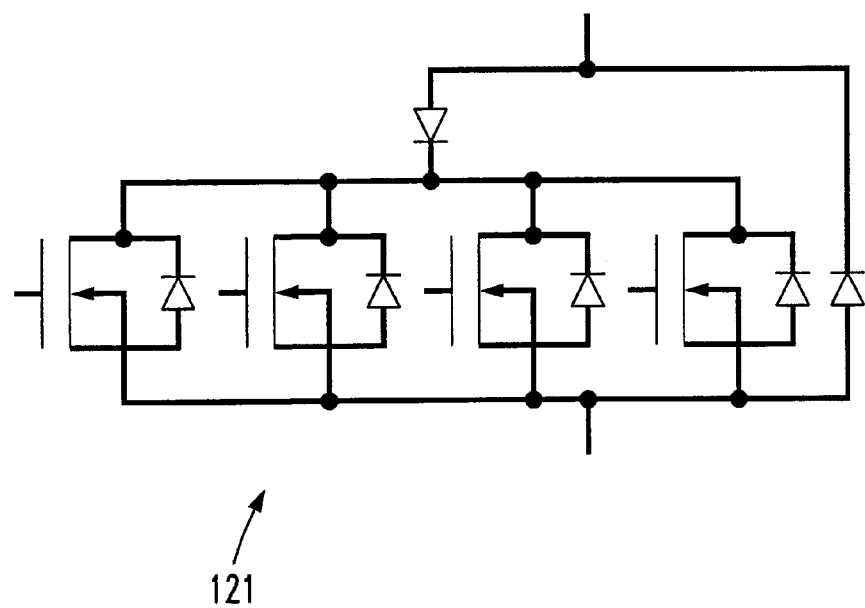
FIGS. 1B and 1C illustrate in greater detail exemplary embodiments of the unidirectional switches that may be used in the prior art boost converter of FIG. 1A for high power applications.
Figure 1C:
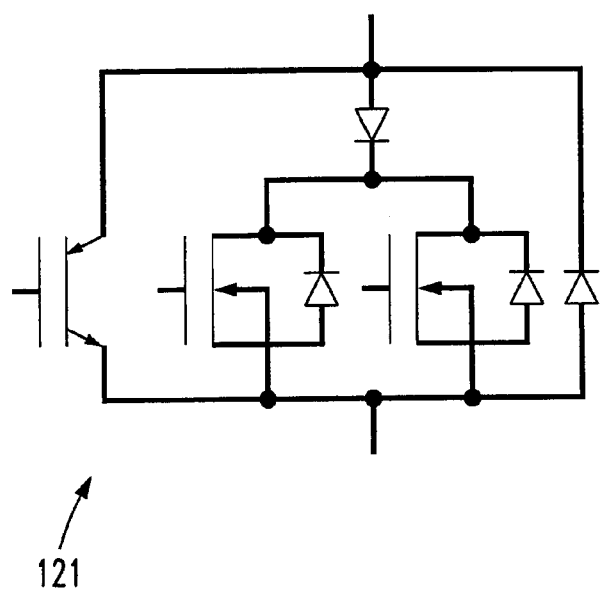
Figure 2A:
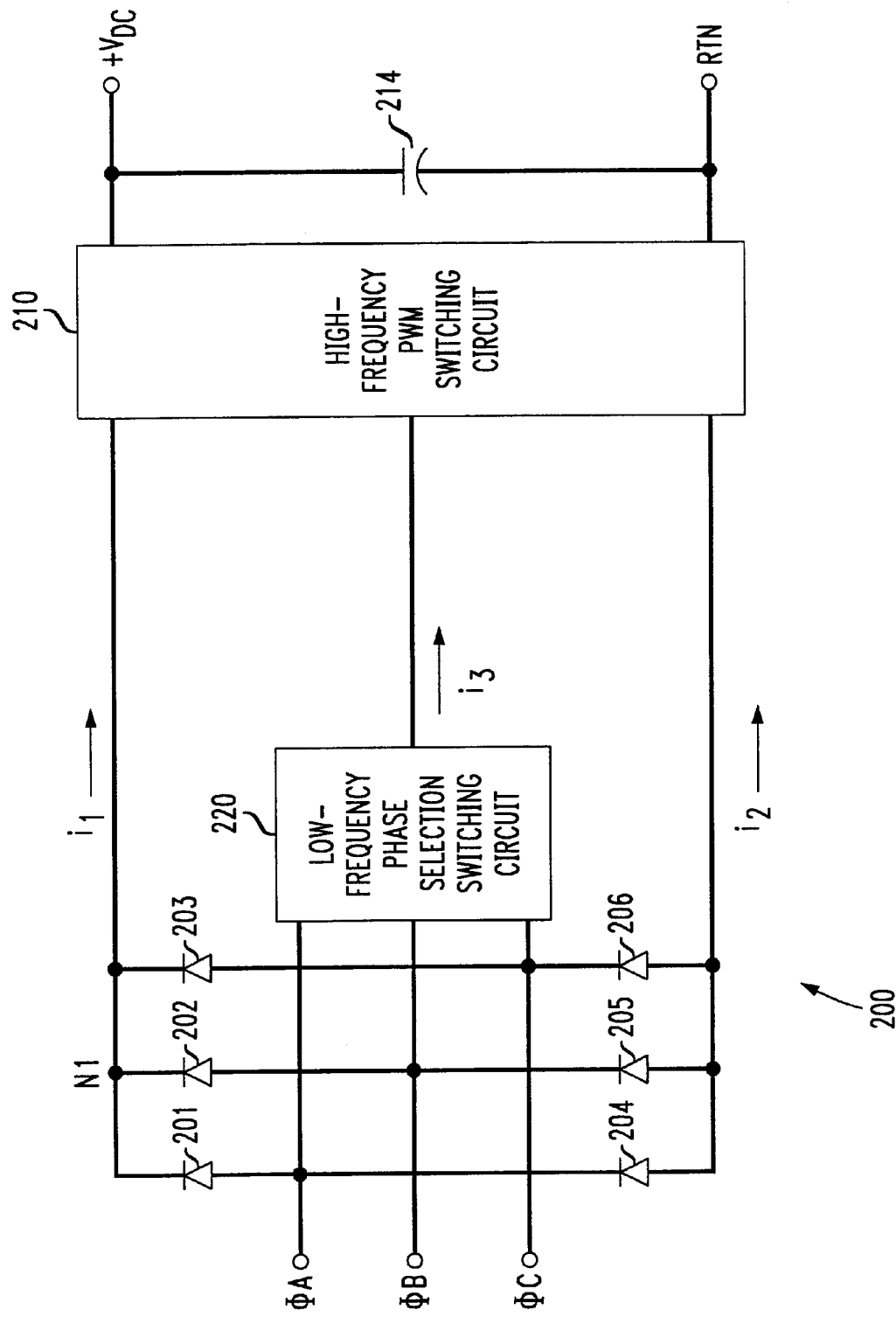
FIG. 2 illustrates a power converter according to a first embodiment of the present invention.
FIG. 2B illustrates a power converter according to a second embodiment of the present invention.

FIG. 2A illustrates power converter 200 according to a first embodiment of the present invention. Power converter 200 includes a three-phase input rectifier stage, comprising diodes 201–206, that feeds high-frequency pulse width modulation (PWM) switching circuit 210. Switching circuit 210 receives currents $i_1$ and $i_2$ from the most positive and most negative phases, respectively, of the rectifier stage and stores energy on storage capacitor 214, thereby generating the DC output, $+V_{DC}$. Power converter 200 also comprises low-frequency phase selection switching circuit 220, which returns current $i_3$ to the phase closest to neutral. High-frequency pulse-width modulation circuit 210 controls and shapes current $i_3$ and at least one, and possibly both, of currents $i_1$ and $i_2$, thereby minimizing total harmonic distortion (THD) in power converter 210. High-frequency PWM circuit 210 causes currents $i_1$, $i_2$ and $i_3$ to have sinusoidal waveshapes.

Figure 2B:
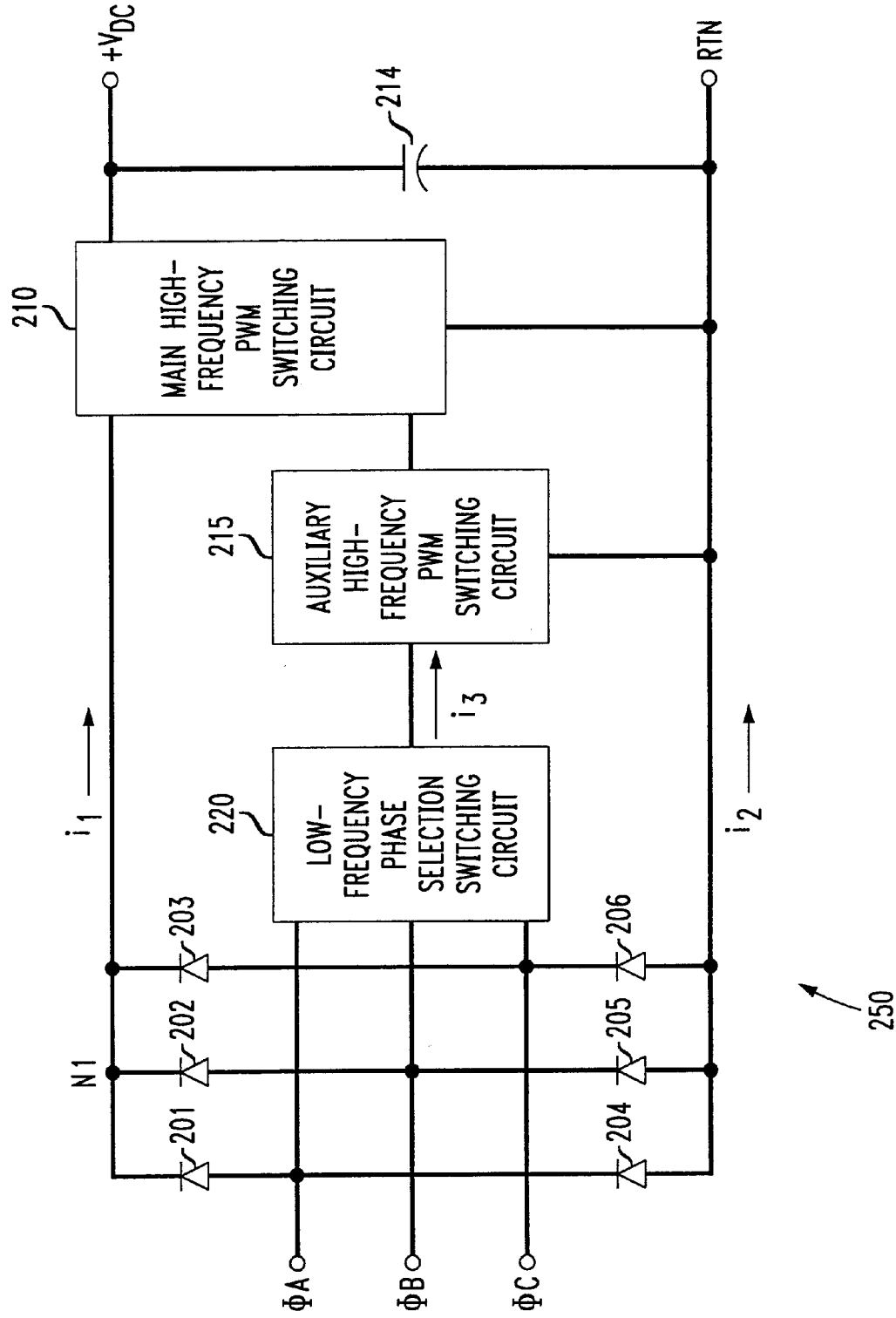

FIG. 2B illustrates power converter 250 according to a second embodiment of the present invention. Like the converter in FIG. 2A, power converter 250 includes a three-phase input rectifier stage, comprising diodes 201–206, that feeds main high-frequency PWM switching circuit 210. Switching circuit 210 stores energy on storage capacitor 214, thereby generating the DC output, $+V_{DC}$. Power converter 250 also comprises auxiliary high-frequency PWM switching circuit 215 (the "switching network") and low-frequency phase selection switching circuit 220 (the "phase selection switching circuit").

The majority of power in converter 250 is processed in main high-frequency PWM switching circuit 210, which generally receives currents $i_1$ and $i_2$ from the most positive and most negative phases, respectively. However, auxiliary high-frequency PWM switching circuit 215 and phase selection switching circuit 220 are used to return current $i_3$ to the phase closest to neutral and to shape the current waveforms, thereby maintaining unity power factor for power converter 250. Auxiliary high-frequency PWM switching circuit 215 controls and shapes current $i_3$ and at least one, and possibly both, of currents $i_1$ and $i_2$, thereby minimizing total harmonic distortion (THD) in power converter 210. Auxiliary high-frequency PWM circuit 215 causes currents $i_1$, $i_2$ and $i_3$ to have sinusoidal waveshapes. The following figures illustrate more detailed embodiments and other variations of power converters 200 and 250 in order to more specifically describe the operation of the present invention.

Figure 3:
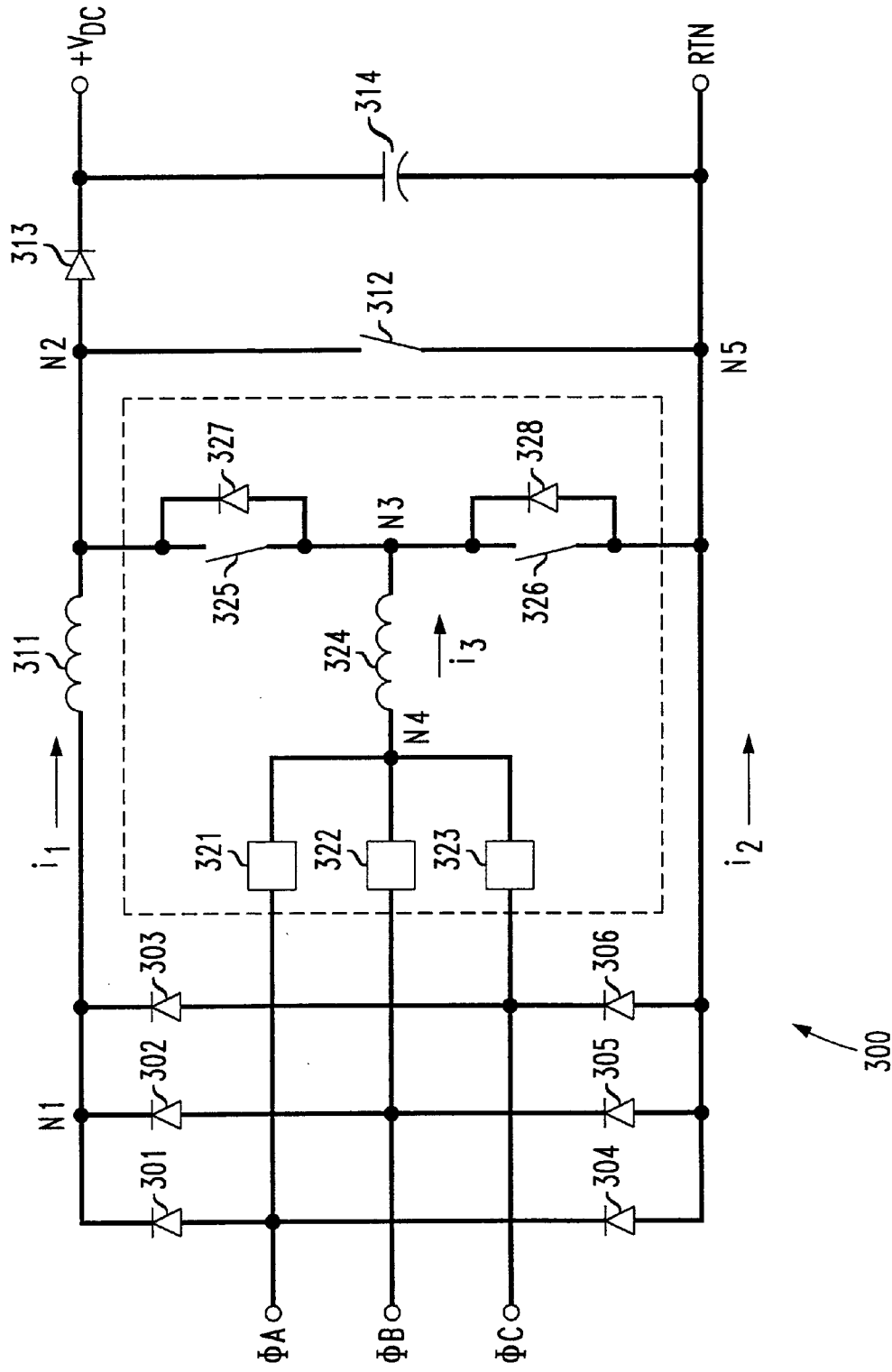
FIG. 3 illustrates a boost converter according to a third embodiment of the present invention.

FIG. 3 illustrates boost converter 300 according to a third embodiment of the present invention. Those skilled in the art will recognize that, without the circuit components inside the dotted line, boost converter 300 is simply a DC/DC boost converter fed by a three-phase, six-diode rectifier, which is one of the simplest and best known three-phase boost converters. Boost converter 300 outputs a DC voltage level, $+V_{DC}$, that is greater than the peak-to-peak amplitude between the three phases of the AC input supply.

The input stage of boost converter 300 comprises low-frequency diodes 301–306, which are coupled to the three input power phases, φA, φB and φC. As will be explained in greater detail below, the boost stage employs high-frequency pulse width modulation ("PWM") switching of switch 312 to draw current through inductor 311 and store the energy onto large storage capacitor 314. Diodes 301–306 form an input rectifier, so that the voltage at node N1 always follows the most positive voltage phase. For example, when φA is the most positive voltage and φC is the most negative voltage, node N1 follows φA and node N5 follows φC.

Switch 312 is opened and closed (i.e., pulsed) at high frequency, for example, 50 KHz. When switch 312 is closed, the current level in inductor 311 ramps up continuously. When switch 312 is opened, the current in inductor 311, which cannot turn off instantly, is diverted through fast recovery diode 313 and flows onto capacitor 314. The current in inductor 311 decreases (ramps down) while the current is being stored on capacitor 314.

The voltage on capacitor 314 is sensed and a feedback circuit (not shown) indirectly adjusts the width of the pulses used to open and close switch 312. If the voltage level on capacitor 314 is too low, the pulse width is increased, so that switch 312 is closed for a longer period of time. This causes the current in inductor 311 to ramp up to a higher level right before switch 314 is reopened. to This higher current level stores a greater amount of charge on capacitor 314 when switch 312 is open, thereby raising the voltage on capacitor 314.

Conversely, if the voltage level on capacitor 314 is too high, the pulse width is decreased, so that switch 312 is closed for a shorter period of time. This allows the current in inductor 311 to ramp up only tc a relatively smaller peak level right before switch 312 is reopened. This relatively lower current level stores a smaller amount of charge on capacitor 314 when switch 312 is open, thereby lowering the voltage on capacitor 314.

In this way, pulse-width modulation is used to vary the duty cycle of switch 312 and thereby control the voltage level on capacitor 314 as the current drain caused by a load attached to capacitor 314 changes. At equilibrium, the amount of charge stored on capacitor 314 when switch 312 is open is equal to the amount of charge drained from capacitor 314 by a load when switch 312 is closed and diode 313 is reversed biased.

Inductor 311, diode 313 and switch 312 correspond to main high-frequency PWM switching circuit 210 in FIG. 2B. However, without the circuitry shown inside the dotted lines in FIG. 3, each input phase current of boost converter 300 would contain substantial harmonics of the AC line frequency. By adding the components inside the dotted line, the boost converter of the present invention maintains the three phase currents, $i_1$, $i_2$ and $i_3$, as sinusoidal waveforms, so that the resultant total harmonic distortion (THD) is very low. This is accomplished by controlling and shaping current $i_3$ and at least one, and possibly both, of currents $i_1$ and $i_2$. Advantageously, switches 321–323, switch 325, switch 326, and inductor 324 consume much less power than the main boost components (inductor 311, switch 312, diode 313), are smaller in size, and produce only a relatively small amount of heat. Switches 321–323, which are bi-directional, correspond to low-frequency phase selection switching circuit 220 in FIG. 2B and connect inductor 324 to the phase closest to neutral. Switches 325 and 326, diodes 327 and 328, and inductor 324 correspond to auxiliary high-frequency PWM switching circuit 215 in FIG. 2B and are responsible for controlling and shaping the waveform of the returned current $i_3$.

Figure 4:
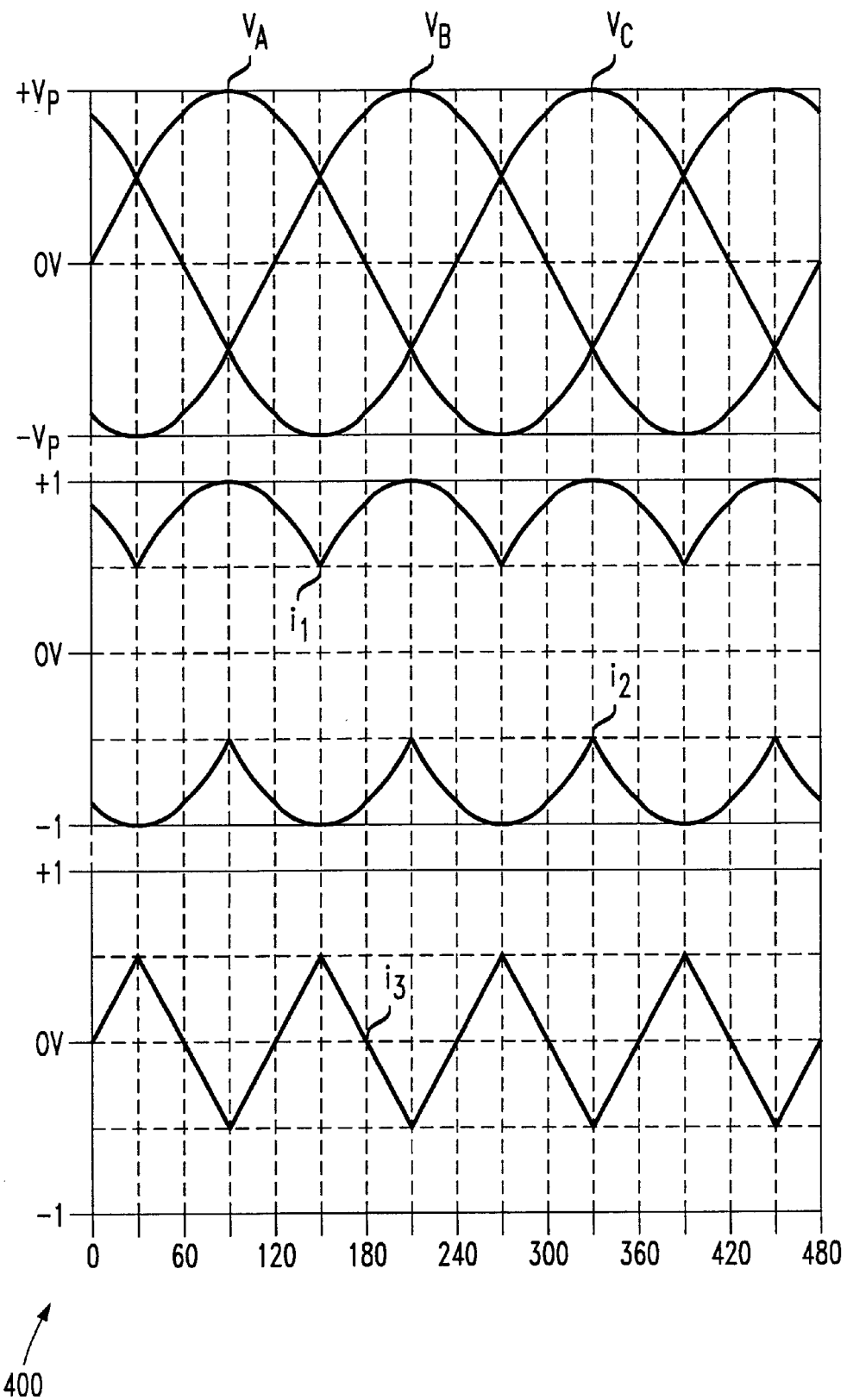
FIG. 4 illustrates the timing relationship between the three phases of the input power supply and selected currents in the boost converter of FIG. 3.

FIG. 4 illustrates the timing relationship between the three phases of the input power supply and selected currents in boost converter 300. The three phase voltages, $V_A$, $V_B$ and $V_C$, which have peak values of $\pm_P$, are shown in the top graph. Under unity power factor operation, the current, $i_1$, in inductor 311 follows the shape of the most positive phase voltage (referenced to neutral). The return current $i_2$ follows the shape of the most negative phase voltage (referenced to neutral). The current $i_3$ in inductor 324 follows the middle waveform between currents $i_1$ and $i_2$. Inductor 324 is Switched every 60° of a line cycle to a different input phase by low-frequency switches 321, 322 and 323 so that inductor 324 is always connected to the phase closest to the neutral. For example, switch 323 is closed from 30° to 90° in FIG. 4 to connect inductor 324 to φC, switch 322 is closed from 90° to 150° to connect inductor 324 to φB, and switch 321 is closed from 150° to 210° to connect inductor 324 to φA.

The method by which switch 312 and switches 325 and 326 control currents $i_1$, $i_2$ and $i_3$ is best explained by the following two examples, which essentially cover all possible input voltage states, namely, two phases greater than zero volts and two phases less than zero volts. The voltage levels on the three phase inputs are sensed and feedback circuits (not shown) open and close low-frequency switches 321–323 and pulse width modulation switches 312, 325 and 326 according to the algorithms described below.

1) $V_A > V_B > 0 > V_C$

From 120° to 150° in FIG. 4, φA voltage is greater than φB voltage, both φA and φB voltages are greater than zero, and φC voltage is less than zero volts. At that point switch 322 is closed, current $i_1 = \phi A$ current, current $i_2 = \phi C$ current and current $i_3 = \phi B$ current, which is greater than zero. Since two of the three currents ($i_1$, $i_2$ and $i_3$) are independent, only two currents need to be controlled in order to fully control all three currents.

For the purpose of controlling current $i_1$, the voltage at node N2 in FIG. 3 should be a pulse width modulated waveform with a proper duty-cycle that makes the average of the pulse width modulated waveform equal to the voltage of $V_A - V_C$. For the purpose of controlling current $i_3$, the voltage at node N3 in FIG. 3 should be a waveform with a proper duty-cycle that makes the average of the pulse width modulated waveform equal to the voltage of $V_B - V_C$. Since $V_B - V_C$ is smaller than $V_A - V_C$, the zero voltage level portion of the voltage waveform at node N3 should be longer than that at node N2.

Figure 5:
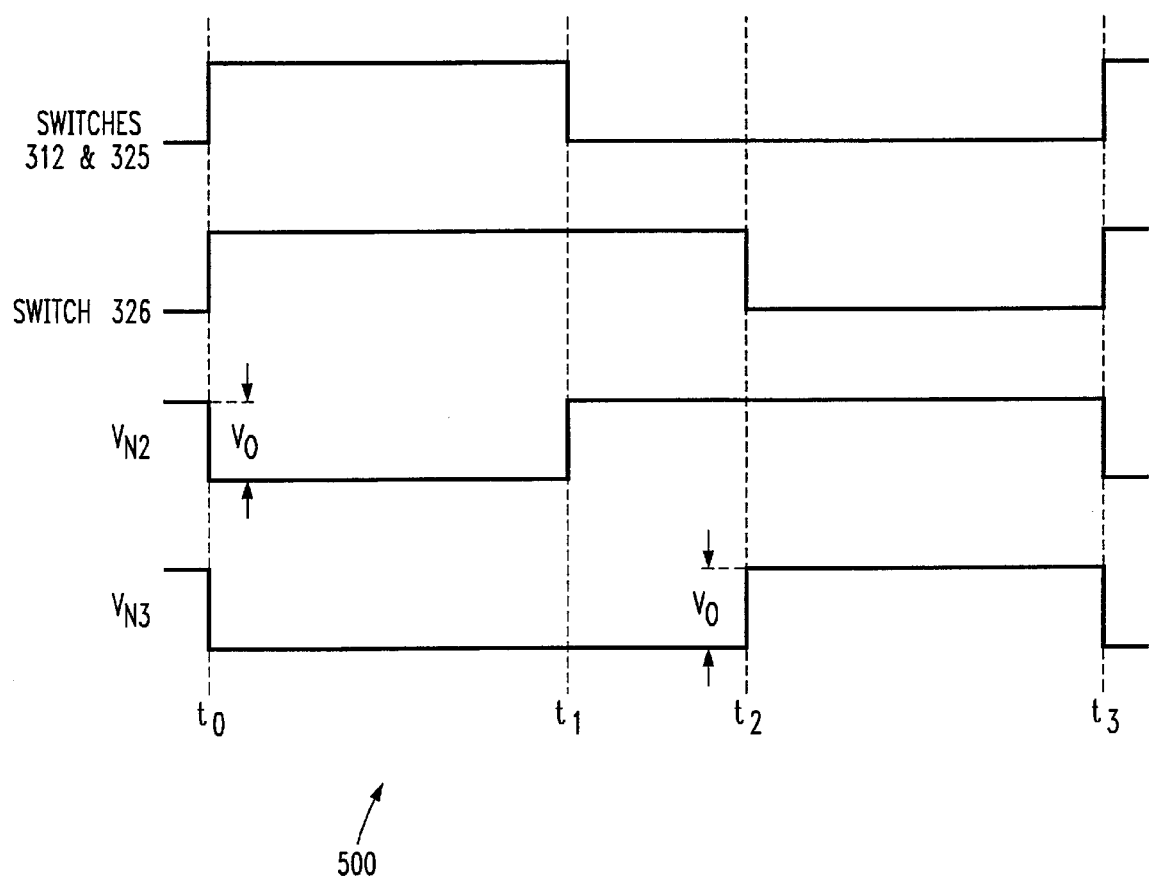
FIG. 5 illustrates the timing relationship of selected switches in the boost converter of FIG. 3 under the input phase voltage conditions: $V_A>V_B>0>V_C$.

FIG. 5 illustrates the timing relationship of selected signals in boost converter 300 under the input phase voltage conditions: $V_A > V_B > 0 > V_C$. The upper two waveforms are drive signals for switches 312, 325 and 326. The lower two waveforms are the voltages at node N2 and node N3 with reference to DC ground. Assuming synchronized turn-on, all three switches are closed at $t_0$, the beginning of a switching cycle, bringing node N2 and node N3 down to DC ground potential. When switch 312 and switch 325 are opened at $t_1$, node N2 moves up to the output potential, but node N3 stays at the DC ground because current $i_3 > 0$ and switch 326 is still closed. At time $t_2$ when switch 326 is opened, current $i_3$ flows through diode 327 and node N3 becomes high.

Although theoretically switch 325 does not have to be switched in order for the circuit to operate properly, closing switch 325 when switch 312 is closed helps reduce losses. Since inductor 324 is always connected to a phase with a lower voltage level than the phase to which inductor 311 is connected, the average value of $V_{N3}$ will always be smaller than the average value of $VN_{N2}$, so the switch controlling the current in inductor 324 always needs a longer "closed" period within a switching cycle than switch 312.

2) $V_A > 0 > V_B > V_C$

From 90° to 120° in FIG. 4, φA voltage is greater than zero, φB voltage is greater than φC voltage, and both φB and φC voltages are less than zero. At that point switch 322 is closed, $i_1 = \phi A$ current, $i_2 = \phi C$ current, and $i_3 = \phi B$ current, which is less than zero.

Figure 6:
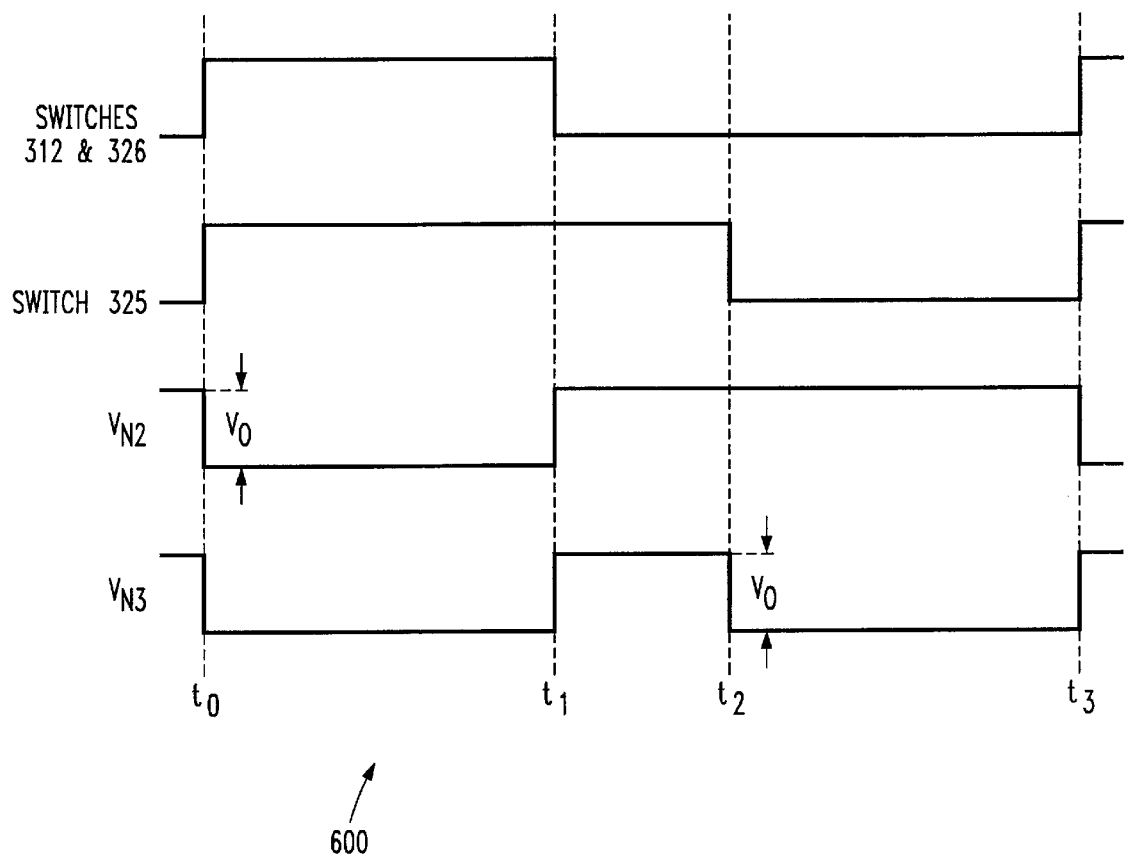
FIG. 6 illustrates the timing relationship of selected switches in the boost converter of FIG. 3 under the input phase voltage conditions: $V_A>0>V_B>V_C$.

FIG. 6 illustrates the timing relationship of selected switches in boost converter 300 under the input phase voltage conditions: $V_A > 0 > VB > VC$. Since current $i_3 < 0$, the voltage on node N3 goes up to the level on node N2 when switches 312 and 326 are opened at $t_1$. When switch 325 is opened at $t_2$, current $i_3$ flows through diode 328 and brings node N3 down to the DC ground.

Since only one of switches 321–323 conducts at any one time, there may be short dead spaces when all three switches are open during switching transients. To compensate, capacitors or small diodes (not shown) may be coupled from node N4 to node N1 and from node N4 to node N5 in FIG. 3 to provide current paths for the current in inductor 324 when all three switches are open. Additionally, diodes 301–306 are slow recovery line frequency rectifiers and require the necessary surge current capability to accommodate expected AC line surges. Diode 313 is a fast switching diode and should also have the required surge current capability. A snubber circuit or soft-switching may be used to compensate for the reverse recovery of diode 313. It should also be noted that switch 312 in FIG. 3 is not necessary to the operation of boost converter 300, since its function may be performed by the series combination of switches 325 and 326. However for most three-phase applications, the power levels are high enough to justify using switch 312 to achieve a better conversion efficiency.

Figure 7:
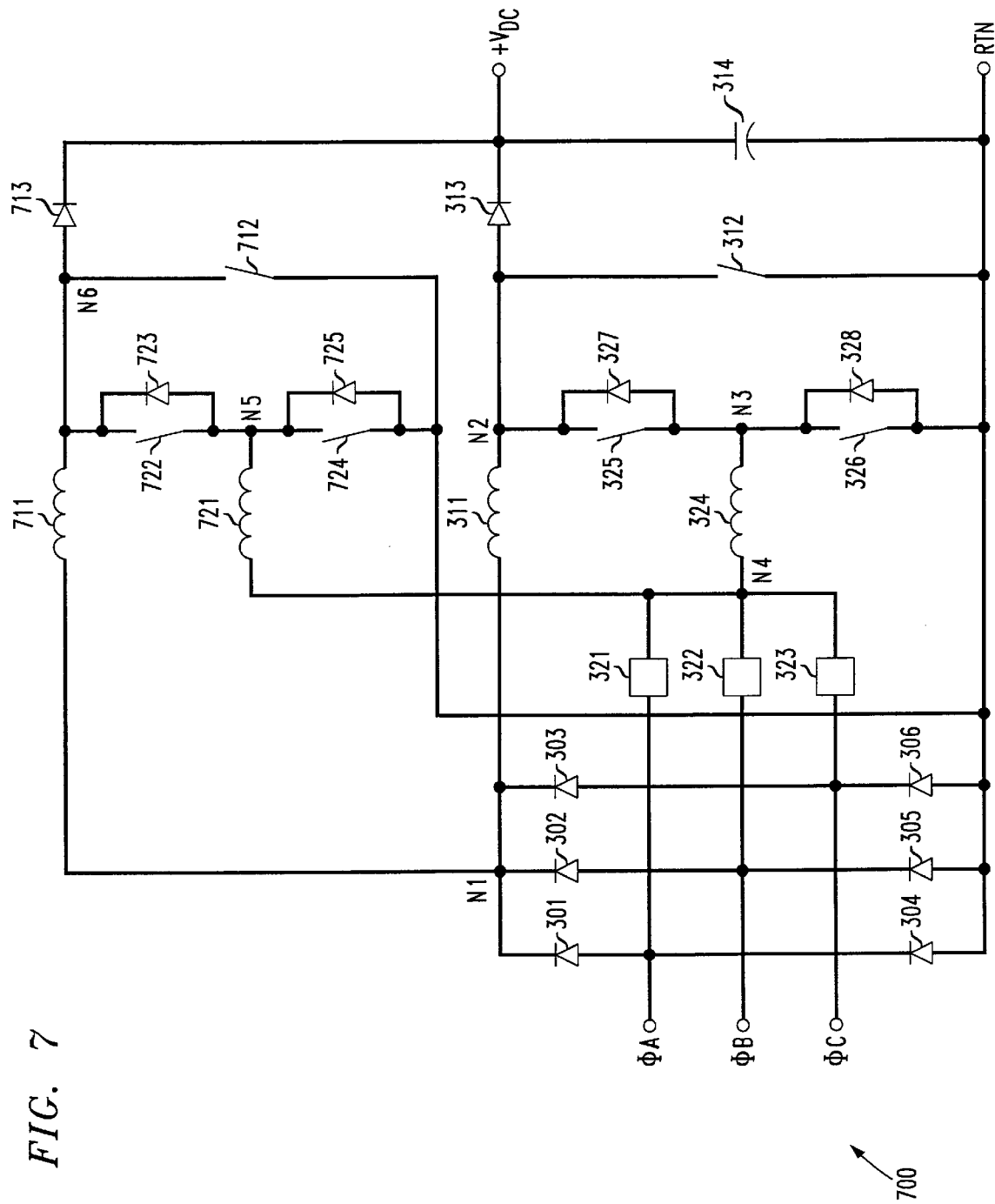
FIG. 7 illustrates an interleaved boost converter according to a fourth embodiment of the present invention.

FIG. 7 illustrates interleaved boost converter 700 according to a fourth embodiment of the present invention. A second boost converter is formed by inductors 711 and 721, switches 722, 724 and 712, and diodes 713, 723 and 725. This second boost converter delivers current to capacitor 314 in parallel with the first boost converter formed by the components in FIG. 3. Switching is synchronized between the two boost converters in order to interleave the delivery of current to capacitor 314. Interleaving can greatly reduce the ripple current in capacitor 314.

Figure 8:
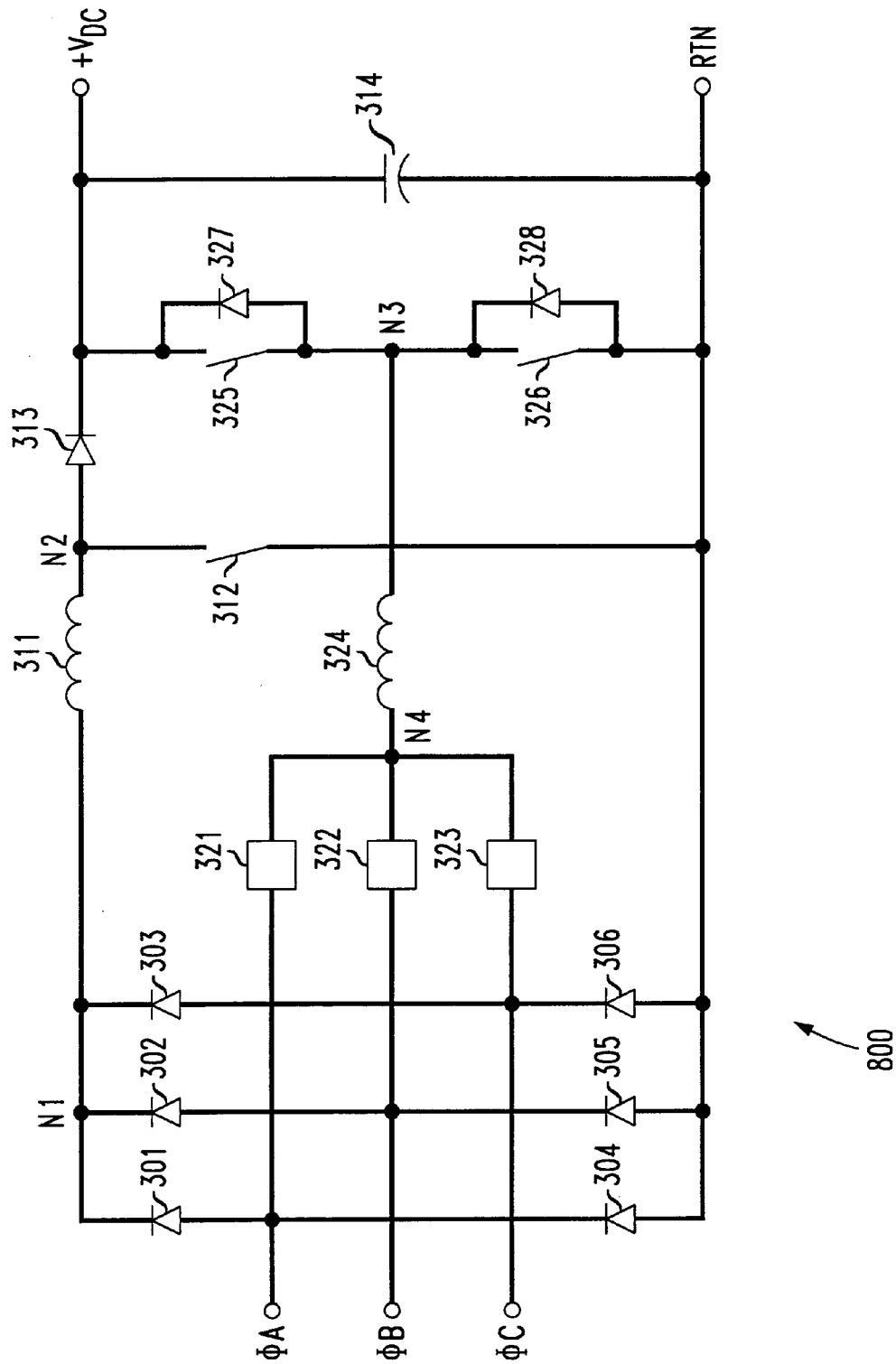
FIG. 8 illustrates a boost converter according to a fifth embodiment of the present invention.

FIG. 8 illustrates boost converter 800 according to a fifth embodiment of the present invention. This is a simple variation of boost converter 300 in FIG. 3, wherein switches 325 and 326 are moved to the other side of diode 313. In this embodiment, diodes 327 and 328 must be fast diodes and snubber circuits may be required. Since switches 325 and 326 are now on the same side of diode 313 as the large storage capacitor 314, switches 325 and 326 are never closed at the same time. Additionally, the gate drivers of switches 325 and 326 may require anti-shoot-through protection.

Figure 9:
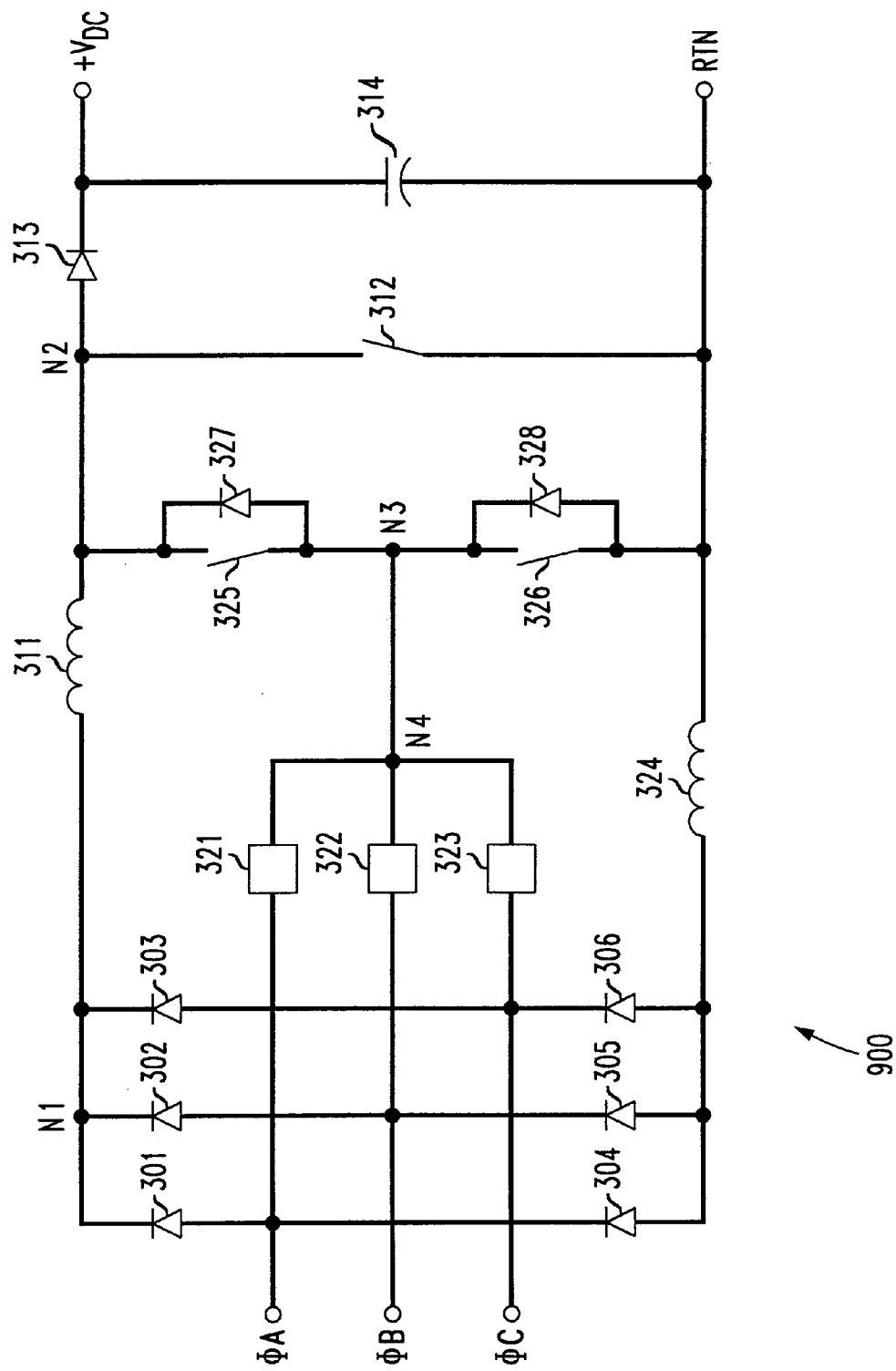
FIG. 9 illustrates a boost converter according to a sixth embodiment of the present invention.

FIG. 9 illustrates boost converter 900 according to a sixth embodiment of the present invention. Inductors may be put in any two of the three branches connecting diodes 301–306 and switches 321–323 to the high-frequency switching devices, switches 325, 326, 312, and diode 313. Inductor 324 is moved to the bottom branch, so that boost converter 900 contains inductors in the top and bottom branches. However, more printed wiring board area becomes EMI-noisy if an inductor is in the bottom branch, as in FIG. 9.

Figure 10:
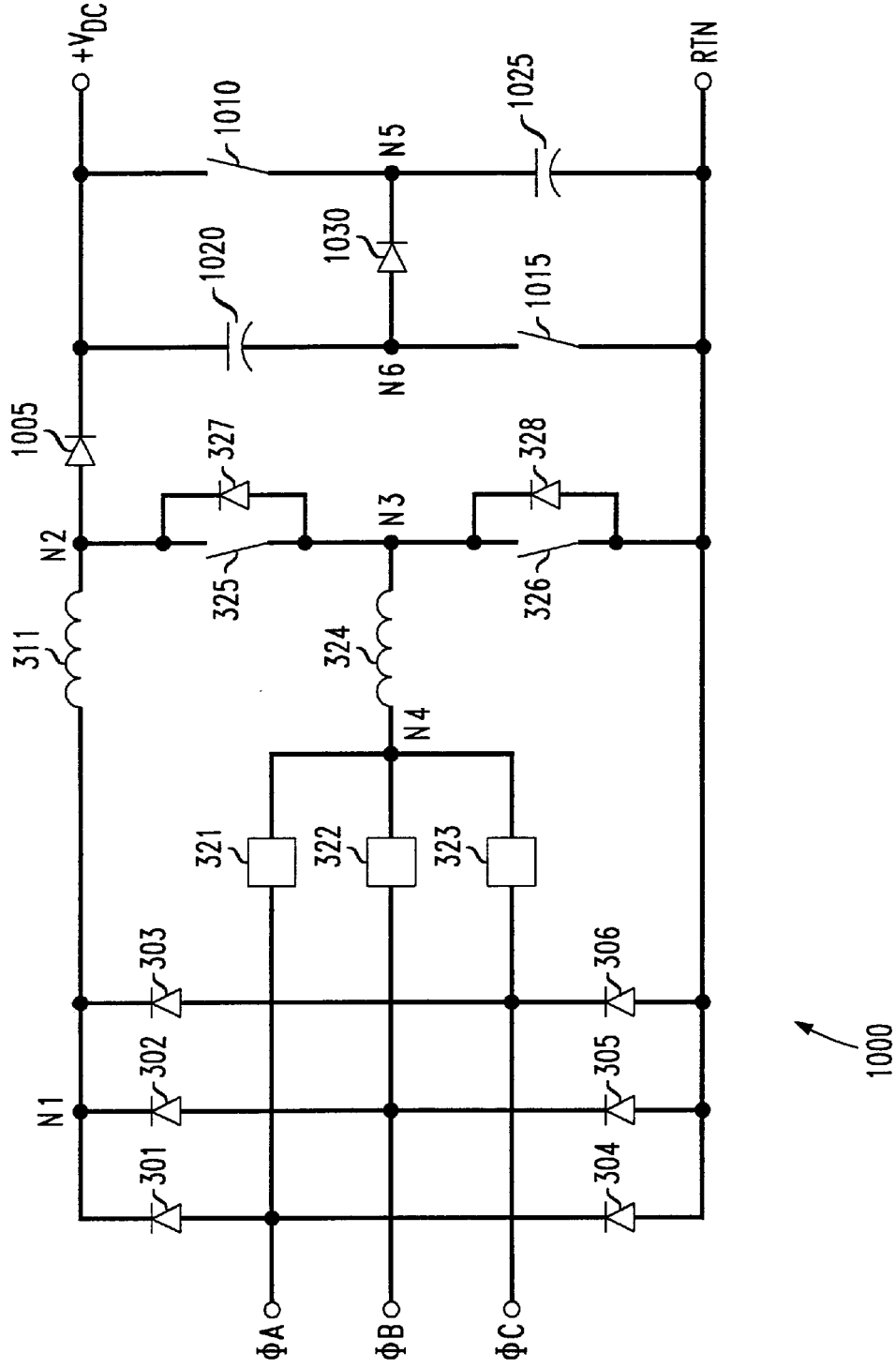
FIG. 10 illustrates a high power factor split-boost converter according to a seventh embodiment of the present invention.

FIG. 10 illustrates high-power factor split-boost converter 1000 according to a seventh embodiment of the present invention. For high AC input applications, such as 400 VRMS (phase-to-phase) inputs, the split boost converter is superior to boost converter 300. When switches 1010 and 1015 are closed, storage capacitors 1020 and 1025 are in parallel and are charged up through diode 1005. When switches 1010 and 1015 are opened, storage capacitors 1020 and 1025 are in series so that their voltages add together and current flows through diode 1030. Diode 1005 must be a fast diode in order to allow slow diodes to be used for diodes 327 and 328. If diode 1005 is not present, then diodes 327 and 328 must be fast recovery diodes and snubbers may be needed to limit losses associated with their reverse recovery.

Figure 11:
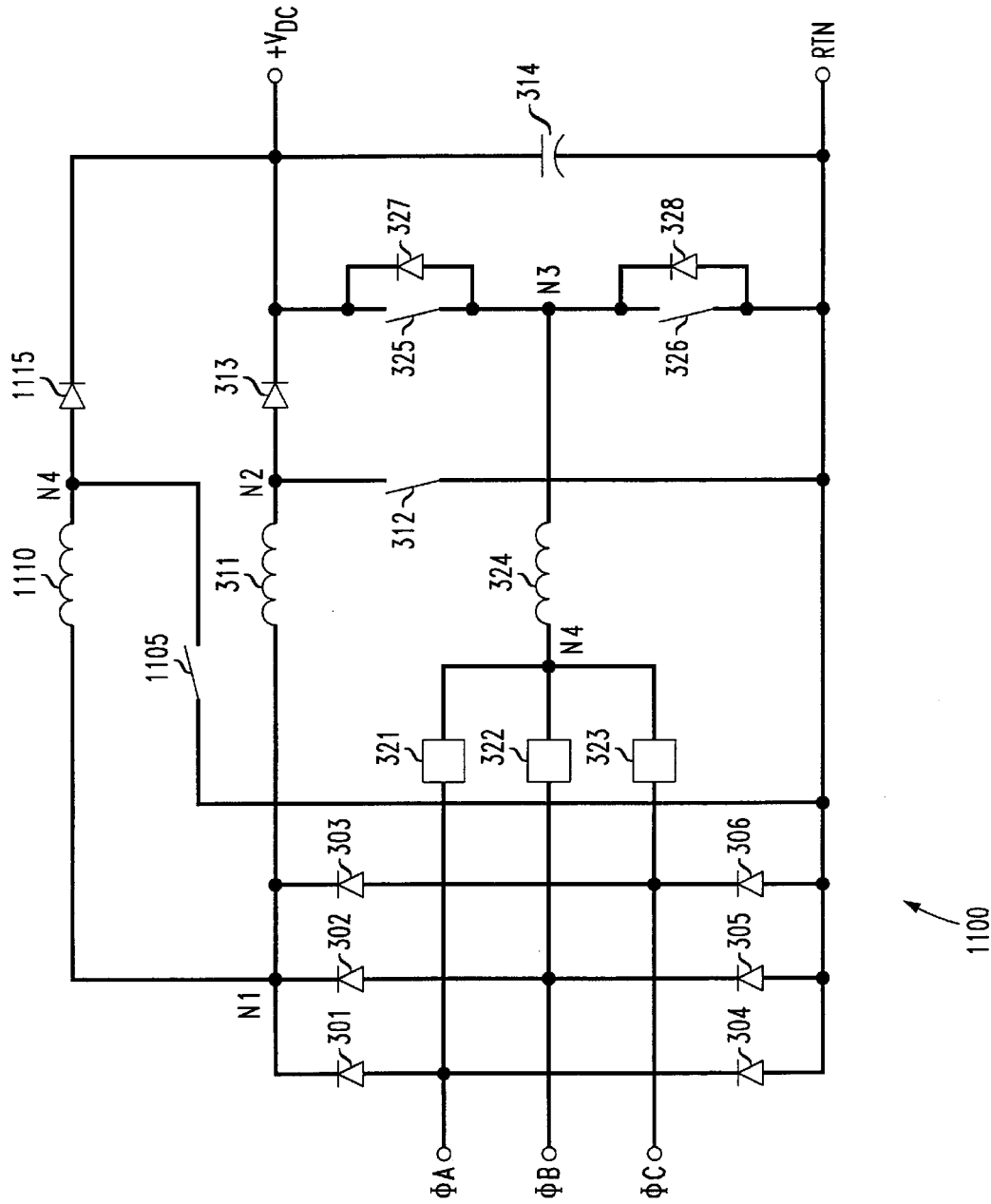
FIG. 11 illustrates an interleaved boost converter according to an eighth embodiment of the present invention.

FIG. 11 illustrates interleaved boost converter 1100 according to an eighth embodiment of the present invention.

Boost converter 1100 is an interleaved version of boost converter 800 in FIG. 8, wherein switches 325 and 326 and diodes 327 and 328 are moved to the output side of boost diode 313. Pulse modulation switch 1105, inductor 1110 and boost diode 1115 form the second boost cell. For interleaving two boost cells with a common auxiliary network, switches 325 and 326 may be on either side of boost diode 313. However, for interleaving three or more boost cells with a single auxiliary network, switches 325 and 326 must be on the output side of boost diode 313.

Figure 12:
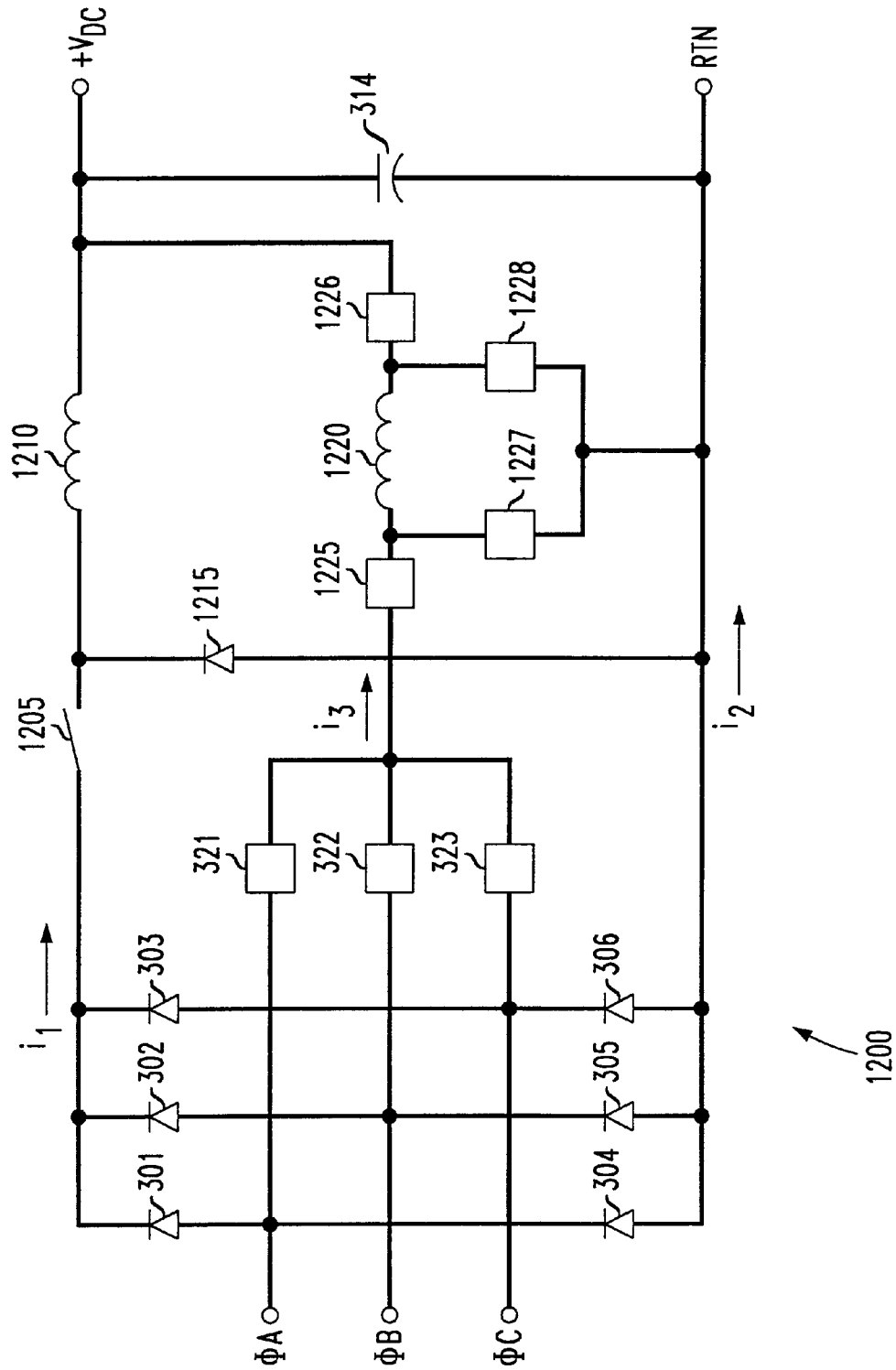
FIG. 12 illustrates a buck converter according to a ninth embodiment of the present invention.

FIG. 12 illustrates buck converter 1200 according to a ninth embodiment of the present invention. Buck converter 1200 is a DC converter that outputs a DC voltage level, $+V_{DC}$, that is less than the peak-to-peak amplitude between the three phases of the AC input supply. Switch 1205, inductor 1210 and diode 1215 correspond to main high-frequency PWM switching circuit 210 in FIG. 2B. Switches 1225–1228 and inductor 1220 correspond to auxiliary high-frequency PWM switching circuit 215 in FIG. 2B and are responsible for controlling and shaping the waveform of the return current $i_3$. Switches 321–323, which are bi-directional, correspond to low-frequency phase selection switching circuit 220 in FIG. 2B and connect inductor 1220 to the phase closest to neutral.

Figure 13:
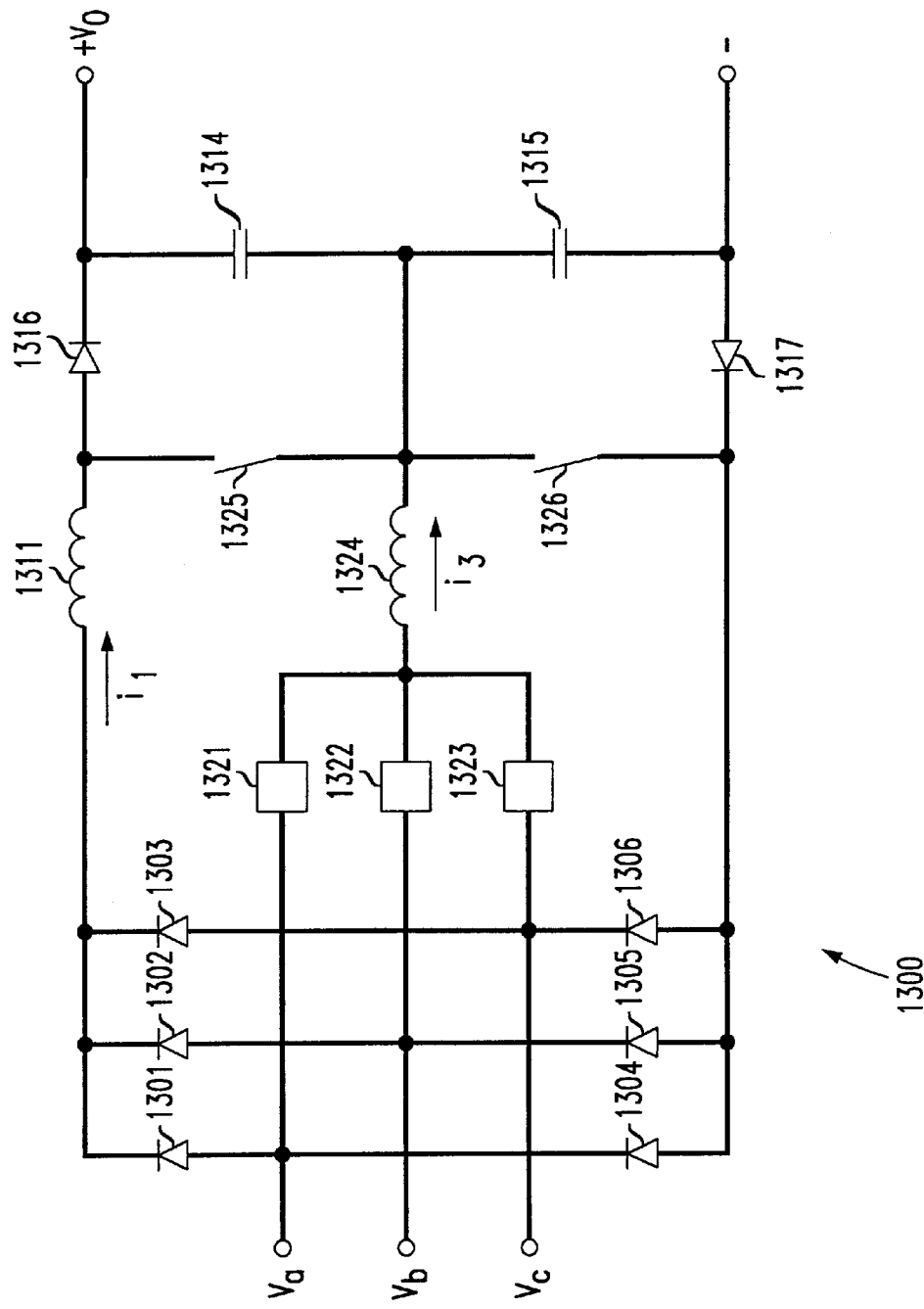
FIG. 13 illustrates a tenth embodiment of a power converter constructed according to the principles of the present invention.

FIG. 13 illustrates a tenth embodiment of a power converter 1300 constructed according to the principles of the present invention. The power converter 1300 is an embodiment of a three-level boost converter wherein a first main switch 1325, and a second main switch 1326 are coupled between the rails of the converter and are also coupled between a first output capacitor 1314 and a second capacitor 1315 of the boost converter. The first and second main switches 1325, 1326 also form a part of a switching network, coupled to a phase selection switching circuit 1321, 1322, 1323 and a rectifier 1301, 1302, 1303, 1304, 1305, 1306, that controls a current waveshape of the inner phase and a current waveshape of at least one other phase, thereby reducing harmonics associated with the three phase AC input current. The three-level boost converter topology allows the voltage stress encountered by several key components to be substantially reduced.

The first and second main switches 1325, 1326 work in concert to perform the boost converter action under the direction of the PWM control circuit (not shown) and also to control the current waveshape of the inner phase by coordinating the closing and opening of the two switches. For the input voltage condition of $V_A > V_B > 0 > V_C$, the currents $i_1$ and $i_3$ have a sense shown in FIG. 13. This condition allows the first and second main switches 1325, 1326 to close at the same time and dictates that the first main switch 1325 opens before the second main switch 1326.

Closure of the first and second main switches 1325, 1326 causes the currents $i_1$ and $i_3$ to both increase while opening of the first main switch 1325 causes $i_1$ to begin decreasing as it begins to charge the first output capacitor 1314. The second main switch 1326, in this example, remains closed long enough to provide adequate control and waveshaping of the current $i_3$ before it is opened thereby lowering the THD as described earlier. The boost converters are advantageously operated in the continuous conduction mode (CCM) which means that the currents $i_1$ and $i_3$ never reach a zero value.

Figure 14:
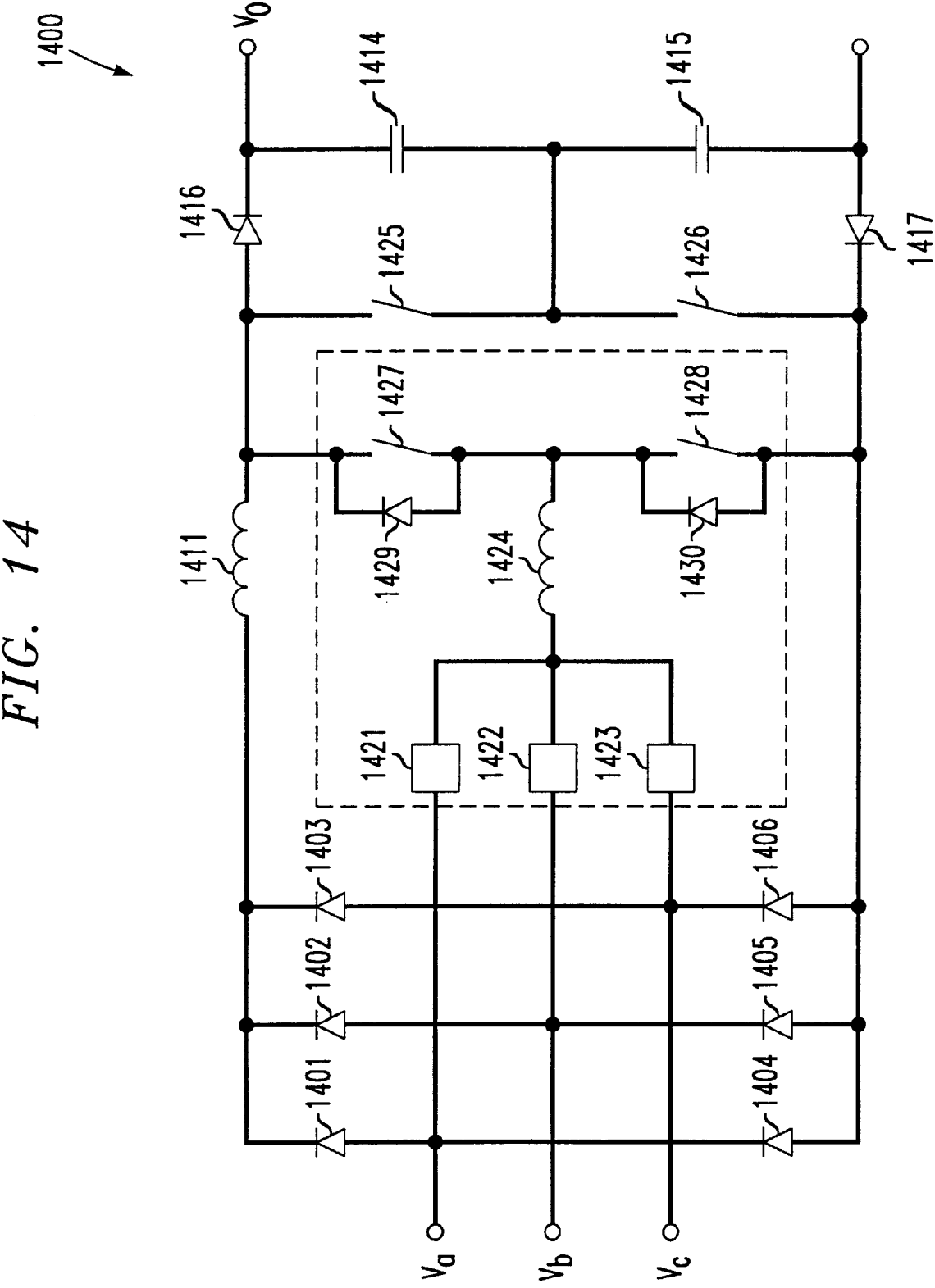
FIG. 14 illustrates an eleventh embodiment of a power converter constructed according to the principles of the present invention.

FIG. 14 illustrates an eleventh embodiment of a power converter 1400 constructed according to the principles of the present invention. The power converter 1400 is an another embodiment of a three-level boost converter wherein a first main switch 1425, and a second main switch 1426 are coupled between a first output capacitor 1414 and a second output capacitor 1415 of the boost converter, and the switching network comprises a first auxiliary switch 1427 having a first parallel diode 1429 and a second auxiliary switch 1428 having a second parallel diode 1430 coupled between the phase selection switching circuit 1421, 1422, 1423 and the rails of the boost converter. The first and second parallel diodes 1429, 1430 provide a path for the current flowing in the switching circuit 1421, 1422, 1423 when the first and second auxiliary switches 1427, 1428 open.

This separation of the main switching functions and the auxiliary switching functions allows for less complicated switching control circuits (not shown). Although more switches may be required, the voltage stress on the first and second main switches is greatly reduced (to one-half of the output voltage) for this configuration thereby allowing less costly components to be used. The first and second auxiliary switches 1427, 1428, however, are required to withstand the full output voltage of the converter.

Figure 15:
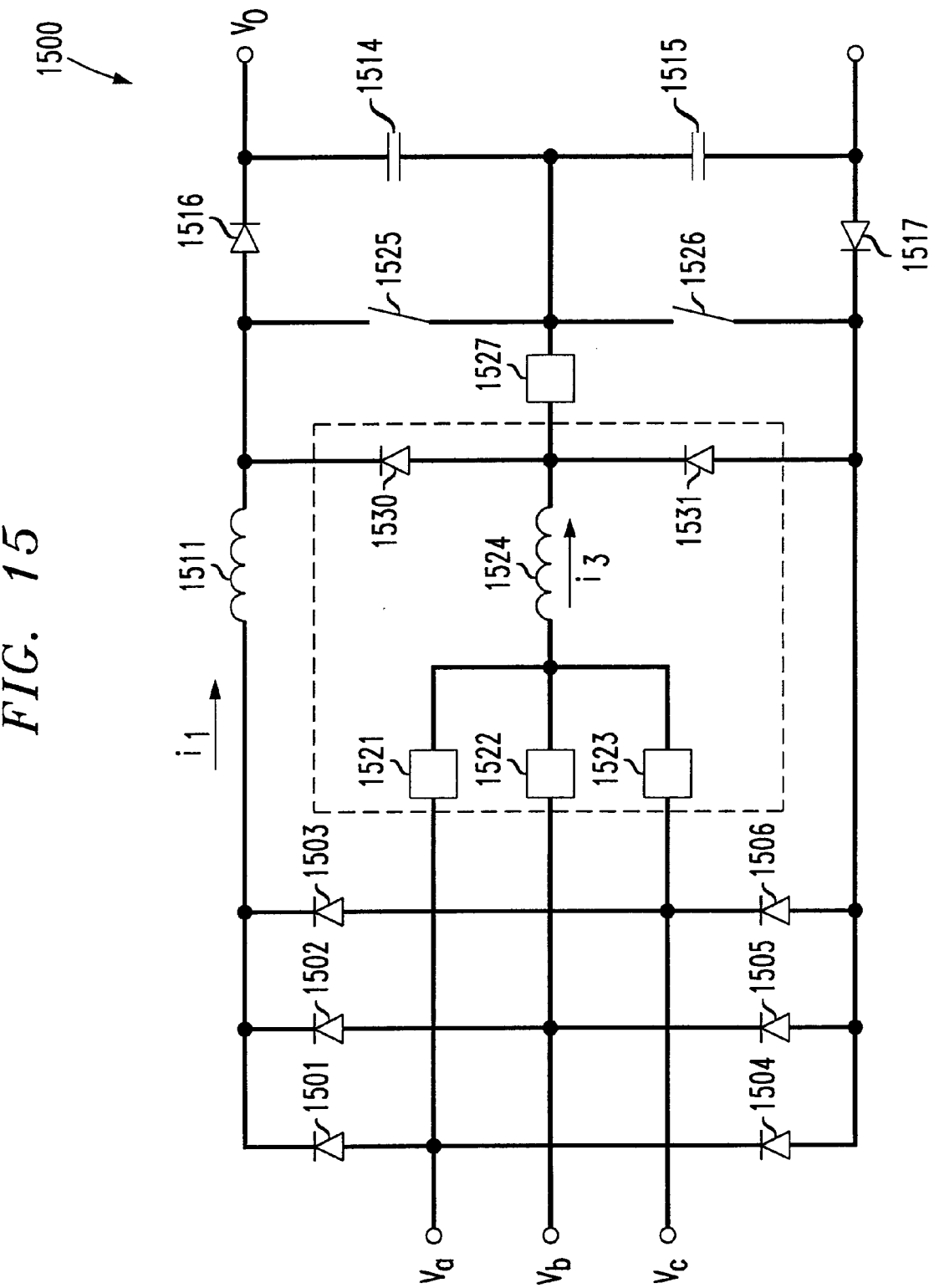
FIG. 15 illustrates a twelfth embodiment of a power converter constructed according to the principles of the present invention.

FIG. 15 illustrates a twelfth embodiment of a power converter 1500 constructed according to the principles of the present invention. The power converter 1500 is an another embodiment of a three-level boost converter wherein the boost converter comprises a first and a second main switch 1525, 1526 that are coupled between a first and a second output capacitor 1514, 1515 of the boost converter. Additionally, a switching network comprises a first and a second auxiliary diode 1530, 1531 that is coupled between a phase selection switching circuit 1521, 1522, 1523 and rails of the boost converter.

Further, a bidirectional switch 1527 is coupled between the first and second auxiliary diodes 1530, 1531 and the first and second main switches 1525, 1526. This arrangement of the bidirectional switch 1527 and the first and second auxiliary diodes reduces the voltage stress of the bidirectional switch 1527 to one-half of the output voltage. The bidirectional switch 1527 is typically required to operate with much greater speed than the phase selection circuit 1521, 1522, 1523 and may be formed by the combination of two unidirectional switches (e.g., field effect transistors).

Figure 16:
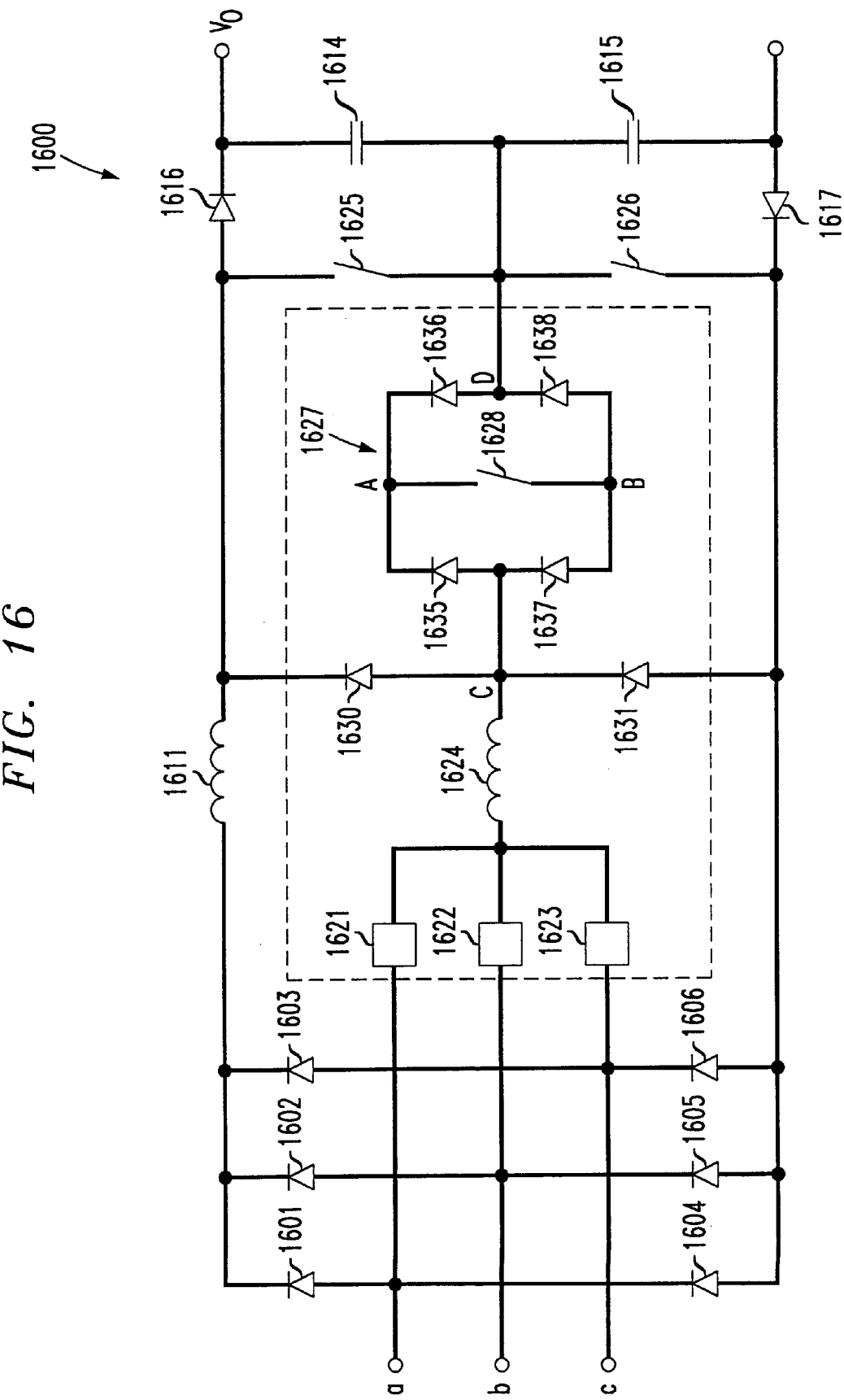
FIG. 16 illustrates a thirteenth embodiment of a power converter constructed according to the principles of the present invention.

FIG. 16 illustrates a thirteenth embodiment of a power converter 1600 constructed according to the principles of the present invention. The power converter 1600 is another embodiment of a three-level boost converter wherein a bidirectional switch 1627 comprises a unidirectional switch 1628 coupled between a node A and a node B of a diode bridge consisting of the diodes 1635, 1636, 1637, 1638. Further, a first auxiliary diode 1630 and a second auxiliary diode 1631 are coupled respectively between an alternate node C of the diode bridge 1635, 1636, 1637, 1638 and the top and bottom rails of the boost converter as shown. This embodiment allows the use of four diodes and a unidirectional switch to accomplish the required bidirectional switching function required for the varying voltage polarities that occur between the node C and the node D.

Figure 17:
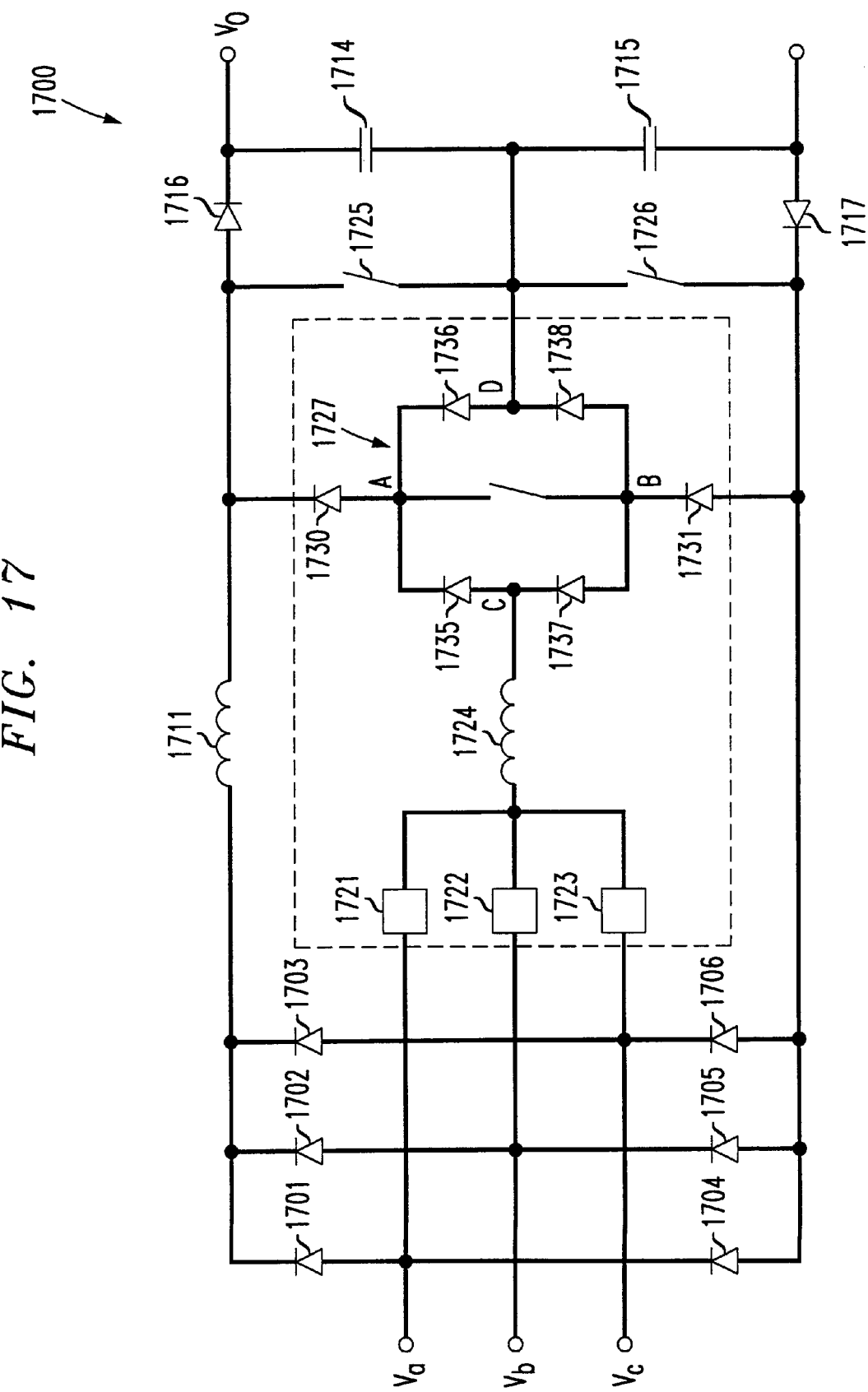
FIG. 17 illustrates a fourteenth embodiment of a power converter constructed according to the principles of the present invention.

FIG. 17 Illustrates a fourteenth embodiment of a power converter 1700 constructed according to the principles of the present invention. The power converter 1700 is an alternate embodiment of the three-level boost converter shown in FIG. 16 wherein a first auxiliary diode 1730 and a second auxiliary diode 1731 are coupled, respectively, between a node A of the diode bridge 1735, 1736, 1737, 1738 and the top rail of the boost converter and a node B of the diode bridge 1735, 1736, 1737, 1738 and the bottom rail of the boost converter as shown.

Figure 18:
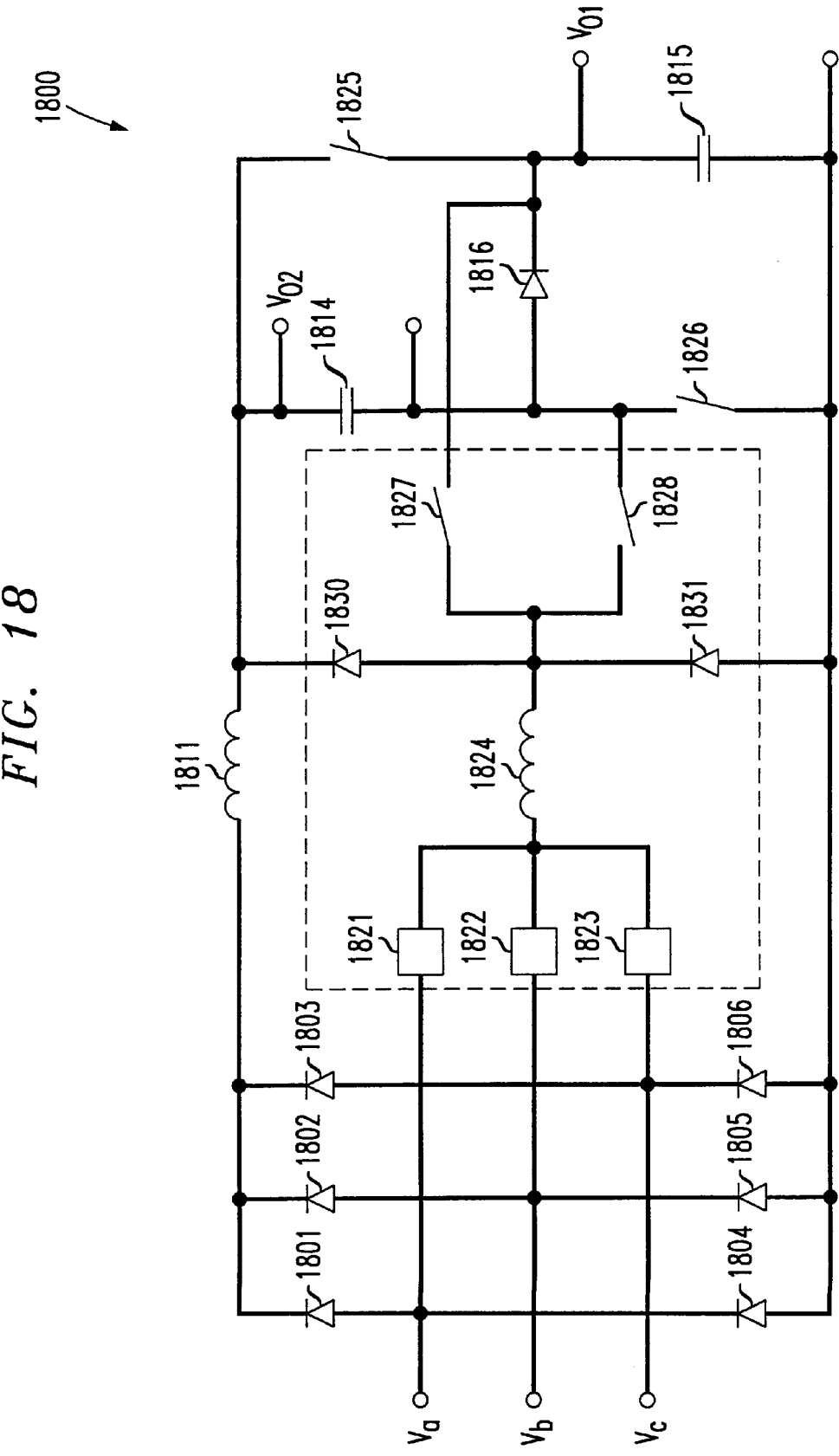
FIG. 18 illustrates a fifteenth embodiment of a power converter constructed according to the principles of the present invention.

FIG. 18 Illustrates a fifteenth embodiment of a power converter constructed according to the principles of the present invention. The power converter 1800 is an another embodiment of a split boost converter wherein the boost converter comprises a first main switch 1825 and a second main switch 1826 that are coupled between a first output capacitor 1814 and a second output capacitor 1815 of the boost converter. The switching network comprises a first auxiliary switch 1827 and a second auxiliary switch 1828 that are coupled between the phase selection switching circuit 1821, 1822, 1823 and the first and second main switches 1825, 1826.

Further, a first auxiliary diode 1830 and a second auxiliary diode 1831 are coupled between the phase selection switching circuit 1821, 1822, 1823 and the first and second auxiliary switches 1827, 1828. Still further, a blocking switch 1816, in the form of a diode in this embodiment, is coupled between the switching network and an output of the boost converter. This embodiment allows both the first and second auxiliary switches 1827, 1828 to be subjected to only half of the output voltage thereby allowing the use of typically lower cost components.

While specific embodiments (and operating conditions) of a power converter and method of delivering an inner phase of three phase AC input power provided to a rectifier have been illustrated and described, other embodiments are well within the broad scope of the present invention. For a better understanding of switching power converters, in general, see "Principles of Power Electronics" by John G. Kassakian, et al., Addison Wesley, Inc. (1991), and for boost converters, see U.S. Pat. No. 5,764,037 by Mark E. Jacobs, et al., entitled "A High Efficiency Boost Topology with Two Outputs," issued on Jun. 9, 1998, and "Universal-Input, High-Power-Factor, Boost Double Rectifiers," by Dragan Maksimovic, et al., IEEE APEC (1995), which are incorporated herein by reference.

Although the present invention has been described in detail, those skilled in the art should understand that they can make various changes, substitutions and alterations herein without departing from the spirit and scope of the invention in its broadest form.

What is claimed is:

1. An active circuit for delivering three phase AC input power received from a three phase rectifier to a boost converter, comprising:
   a phase selection switching circuit, coupled to said rectifier, that selects an inner phase of said three phase AC input power; and
   a switching network, coupled to said phase selection switching circuit and said rectifier, that controls a current waveshape of said inner phase and a current waveshape of at least one other phase, thereby to reduce harmonics associated with three phase AC input current.

2. The active circuit as recited in claim 1 wherein said boost converter comprises a main switch and said switching network comprises first and second auxiliary switches coupled between said phase selection switching circuit and rails of said boost converter.

3. The active circuit as recited in claim 1 wherein said boost converter comprises first and second main switches coupled between rails of said boost converter, said switching network comprising said first and second main switches.

4. The active circuit as recited in claim 1 wherein said boost converter comprises first and second main switches coupled between first and second output capacitors of said boost converter and said switching network comprises first and second auxiliary switches coupled between said phase selection switching circuit and rails of said boost converter.

5. The active circuit as recited in claim 1 wherein said boost converter comprises first and second main switches coupled between first and second output capacitors of said boost converter and said switching network comprises:
   first and second auxiliary diodes coupled between said phase selection switching circuit and rails of said boost converter; and
   a bidirectional switch coupled between said first and second auxiliary diodes and said first and second main switches.

6. The active circuit as recited in claim 5 wherein said bidirectional switch comprises a unidirectional switch coupled between nodes of a diode bridge.

7. The active circuit as recited in claim 6 wherein said first and second auxiliary diodes are coupled to respective ones of said nodes.

8. The active circuit as recited in claim 1 wherein said boost converter comprises first and second main switches coupled across first and second output capacitors of said boost converter and a blocking switch coupled between said first and second output capacitors, said switching network comprising:
   first and second auxiliary switches coupled between said phase selection switching circuit and said first and second main switches; and
   first and second auxiliary diodes coupled between said first and second auxiliary switches and rails of said boost converter.

9. The active circuit as recited in claim 1 wherein said boost converter further comprises at least one blocking switch coupled between said switching network and an output of said boost converter.

10. The active circuit as recited in claim 1 wherein said boost converter is selected from the group consisting of:
    a three-level boost converter, and
    a split boost converter.

11. For use in a boost converter fed by a three phase rectifier, a method of delivering an inner phase of three phase AC input power provided to said rectifier, comprising:
    selecting an inner phase of said three phase AC input power; and
    controlling a current waveshape of said inner phase and a current waveshape of at least one other phase to said boost converter thereby to reduce harmonics associated with three phase AC input current.

12. The method as recited in claim 11 wherein said boost converter comprises a main switch, said controlling comprising controlling first and second auxiliary switches coupled to rails of said boost converter.

13. The method as recited in claim 11 wherein said boost converter comprises first and second main switches coupled between rails of said boost converter, said controlling comprising controlling said first and second main switches.

14. The method as recited in claim 11 wherein said boost converter comprises first and second main switches coupled between first and second output capacitors of said boost converter, said controlling comprising controlling first and second auxiliary switches coupled to rails of said boost converter.

15. The method as recited in claim 11 wherein said boost converter comprises first and second main switches coupled between first and second output capacitors of said boost converter, said controlling comprising:

controlling first and second auxiliary diodes coupled to rails of said boost converter; and controlling a bidirectional switch coupled between said first and second auxiliary diodes and said first and second main switches.

16. The method as recited in claim 15 wherein said bidirectional switch comprises a unidirectional switch coupled between nodes of a diode bridge.

17. The method as recited in claim 16 wherein said first and second auxiliary diodes are coupled to respective ones of said nodes.

18. The method as recited in claim 11 wherein said boost converter comprises first and second main switches coupled across first and second output capacitors of said boost converter and a blocking switch coupled between said first and second output capacitors, said controlling comprising:

controlling first and second auxiliary switches coupled between said phase selection switching circuit and said first and second main switches; and controlling first and second auxiliary diodes coupled between said first and second auxiliary switches and rails of said boost converter.

19. The method as recited in claim 11 further comprising coupling at least one blocking switch between said switching network and an output of said boost converter.

20. The method as recited in claim 11 wherein said boost converter is selected from the group consisting of:

a three-level boost converter, and a split boost converter.

21. A power converter, comprising:

a three phase rectifier;

a boost converter, coupled to said three phase rectifier, that receives rectified power therefrom; and an active circuit for delivering three phase AC input power received from said three phase rectifier to said boost converter, including:

a phase selection switching circuit, coupled to said rectifier, that selects an inner phase of said three phase AC input power, and a switching network, coupled to said phase selection switching circuit and said rectifier, that controls a current waveshape of said inner phase and a current waveshape of at least one other phase, thereby to reduce harmonics associated with said three phase AC input current.

22. The power converter as recited in claim 21 wherein said boost converter comprises a main switch and said switching network comprises first and second auxiliary switches coupled between said phase selection switching circuit and rails of said boost converter.

23. The power converter as recited in claim 21 wherein said boost converter comprises first and second main switches coupled between rails of said boost converter, said switching network comprising said first and second main switches.

24. The power converter as recited in claim 21 wherein said boost converter comprises first and second main switches coupled between first and second output capacitors of said boost converter and said switching network comprises first and second auxiliary switches coupled between said phase selection switching circuit and rails of said boost converter.

25. The power converter as recited in claim 21 wherein said boost converter comprises first and second main switches coupled between first and second output capacitors of said boost converter and said switching network comprises:

first and second auxiliary diodes coupled between said phase selection switching circuit and rails of said boost converter; and a bidirectional switch coupled between said first and second auxiliary diodes and said first and second main switches.

26. The power converter as recited in claim 25 wherein said bidirectional switch comprises a unidirectional switch coupled between nodes of a diode bridge.

27. The power converter as recited in claim 26 wherein said first and second auxiliary diodes are coupled to respective ones of said nodes.

28. The power converter as recited in claim 21 wherein said boost converter comprises first and second main switches coupled across first and second output capacitors of said boost converter and a blocking switch coupled between said first and second output capacitors, said switching network comprising:

first and second auxiliary switches coupled between said phase selection switching circuit and said first and second main switches; and first and second auxiliary diodes coupled between said first and second auxiliary switches and rails of said boost converter.

29. The power converter as recited in claim 21 wherein said boost converter further comprises at least one blocking switch coupled between said switching network and an output of said boost converter.

30. The power converter as recited in claim 21 wherein said boost converter is selected from the group consisting of:

a three-level boost converter, and a split boost converter.

* * * * *